US009420587B2

(12) United States Patent
Lee et al.

(10) Patent No.: US 9,420,587 B2
(45) Date of Patent: *Aug. 16, 2016

(54) METHOD AND APPARATUS FOR TRANSMITTING DATA BETWEEN WIRELESS DEVICES IN WIRELESS COMMUNICATION SYSTEM

(71) Applicant: LG ELECTRONICS INC., Seoul (KR)

(72) Inventors: Hyun Woo Lee, Anyang-si (KR); Hye Young Choi, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/956,197

(22) Filed: Dec. 1, 2015

(65) Prior Publication Data
US 2016/0088621 A1 Mar. 24, 2016

Related U.S. Application Data

(63) Continuation of application No. 14/667,375, filed on Mar. 24, 2015, now Pat. No. 9,241,362, which is a continuation of application No. 13/773,545, filed on Feb. 21, 2013, now Pat. No. 9,019,921.

(60) Provisional application No. 61/601,559, filed on Feb. 22, 2012, provisional application No. 61/602,570, filed on Feb. 23, 2012.

(51) Int. Cl.
| | |
|---|---|
| *H04W 4/00* | (2009.01) |
| *H04W 72/04* | (2009.01) |
| *H04W 56/00* | (2009.01) |
| *H04W 76/02* | (2009.01) |
| *H04L 5/00* | (2006.01) |
| *H04W 84/18* | (2009.01) |

(52) U.S. Cl.
CPC .......... *H04W 72/0446* (2013.01); *H04L 5/0048* (2013.01); *H04W 4/005* (2013.01); *H04W 56/00* (2013.01); *H04W 72/0406* (2013.01); *H04W 76/023* (2013.01); *H04W 84/18* (2013.01)

(58) Field of Classification Search
None
See application file for complete search history.

(56) References Cited

U.S. PATENT DOCUMENTS

| | | | | | |
|---|---|---|---|---|---|
| 5,995,500 | A  | * | 11/1999 | Ma ........................ | H04W 84/08 370/337 |
| 6,674,817 | B1 | * | 1/2004 | Dolle ................... | H04B 7/2656 375/342 |
| 8,179,833 | B2 | * | 5/2012 | Attar ..................... | H04W 28/18 370/319 |
| 2004/0008646 | A1 | * | 1/2004 | Park ..................... | H04B 7/2643 370/331 |
| 2006/0165193 | A1 | * | 7/2006 | Halfmann ............. | H04B 7/2615 375/295 |
| 2006/0168343 | A1 | * | 7/2006 | Ma ........................ | H04W 52/38 709/245 |
| 2006/0251045 | A1 | * | 11/2006 | Okubo ................. | H04W 56/001 370/350 |

(Continued)

*Primary Examiner* — Bunjob Jaroenchonwanit
(74) *Attorney, Agent, or Firm* — Lee, Hong, Degerman, Kang and Waimey

(57) ABSTRACT

A method for transmitting data between wireless devices in a wireless communication system is provided. A first wireless device acquires downlink reception timing with a base station. The first wireless device determines transmission timing for direct communication with a second wireless device based on the downlink reception timing with the base station. The first wireless device transmits data for the direct communication to the second wireless device at the transmission timing for the direct communication.

8 Claims, 31 Drawing Sheets

(56) References Cited

U.S. PATENT DOCUMENTS

| | | | | |
|---|---|---|---|---|
| 2009/0017807 A1* | 1/2009 | Kwon | ............ | H04W 76/021 455/416 |
| 2009/0323659 A1* | 12/2009 | Zhang | ............ | H04W 76/023 370/338 |
| 2011/0255450 A1* | 10/2011 | Wang | ............ | H04W 72/0493 370/280 |
| 2012/0014334 A1* | 1/2012 | Oh | ............ | H04W 72/085 370/329 |
| 2012/0195285 A1* | 8/2012 | Ko | ............ | H04L 5/0048 370/330 |
| 2013/0039324 A1* | 2/2013 | Kwon | ............ | H04W 72/04 370/329 |
| 2013/0058317 A1* | 3/2013 | Park | ............ | H04L 5/0092 370/336 |
| 2013/0107851 A1* | 5/2013 | Park | ............ | H04B 7/026 370/329 |
| 2013/0315214 A1* | 11/2013 | Bai | ............ | H04L 5/001 370/336 |
| 2014/0003400 A1* | 1/2014 | Lim | ............ | H04L 1/1861 370/336 |
| 2015/0201445 A1 | 7/2015 | Lee et al. | | |

\* cited by examiner

FIG. 29
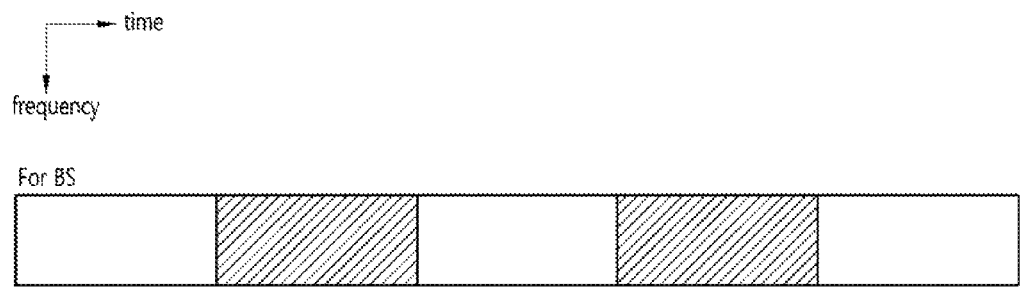
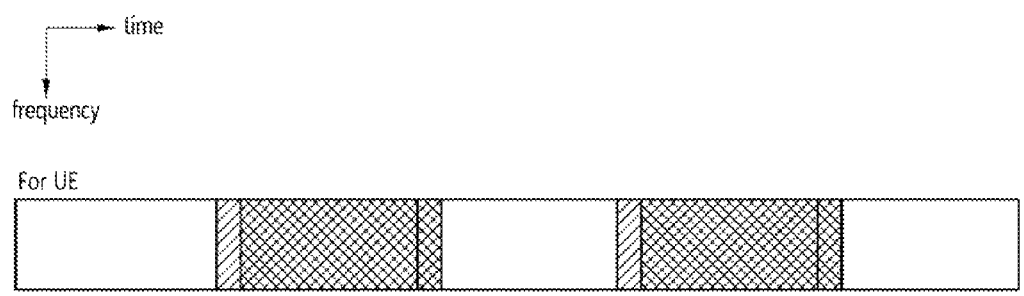

METHOD AND APPARATUS FOR TRANSMITTING DATA BETWEEN WIRELESS DEVICES IN WIRELESS COMMUNICATION SYSTEM

CROSS-REFERENCE TO RELATED APPLICATIONS

This application is a continuation of U.S. patent application Ser. No. 14/667,375, filed on Mar. 24, 2015, now U.S. Pat. No. 9,241,362, which is a continuation of U.S. patent application Ser. No. 13/773,545, filed on Feb. 21, 2013, now U.S. Pat. No. 9,019,921, which claims the benefit of U.S. Provisional Patent Application Nos. 61/601,559, filed on Feb. 22, 2012, and 61/602,570, filed on Feb. 23, 2012, the contents of which are all hereby incorporated by reference herein in their entirety.

BACKGROUND OF THE INVENTION

1. Field of the Invention

The present invention relates to wireless communication. More particularly, the present invention relates to a method for transmitting data between wireless devices in a wireless communication system and an apparatus using the same.

2. Discussion of the Related Art

The next generation wireless communication system under active research aims a system capable of transmitting various kinds of information such as video and wireless data, being evolved from the initial system providing voice-oriented services. The fourth-generation wireless communication currently under development subsequent to the third-generation wireless communication aims to support high speed data transmission with 1 Gbps (gigabits per second) data rate in the downlink and 500 Mbps (megabits per second) in the uplink. The main objective of wireless communication system is to provide a plurality of users with reliable communication means independent of their location and mobility. However, any wireless communication channel always reveals non-ideal characteristics such as path loss, noise, fading due to multipath, inter-symbol interference (ISI), or Doppler Effect due to mobility of a terminal. Various technologies are under development to overcome non-ideal characteristics of wireless communication channels and improve reliability thereof.

Meanwhile, data capacity for cellular wireless systems is ever increasing according to the introduction of machine type communication (MTC) and the advent and deployment of various devices such as smart phones and tablet PCs. Various technologies are under development to meet the needs for high data capacity. For example, carrier aggregation (CA) technology and cognitive radio (CR) technology are good examples of an effort to utilize frequency bandwidth more efficiently. Also, multi-antenna technology, multi-base station collaboration technology, a direct communication system, etc. to increase data capacity within limited frequency bandwidth are being studied.

In direct communication system, user equipments (UEs) directly perform transmission and reception between themselves without relay of a base station. In a direct communication system, there is needed a method for acquiring transmission/reception timing and/or synchronization between the UEs for performing transmission and reception between the UEs, and a method for minimizing the interference that can occur during direct communication.

SUMMARY OF THE INVENTION

The present invention provides a method for data transmission between wireless devices in wireless communication system.

The present invention also provides a method for acquiring transmission and/or reception timing in direct communication and apparatus using the same.

The present invention also provides a method for acquiring synchronization between wireless devices in direct communication and apparatus using the same.

The present invention also provides a method for reducing interference that can occur in direct communication and apparatus using the same.

In an aspect, a method for transmitting data between wireless devices in a wireless communication system is provided. The method comprises: acquiring, by a first wireless device, downlink reception timing with a base station, determining, by the first wireless device, transmission timing for direct communication with a second wireless device based on the downlink reception timing with the base station, and transmitting, by the first wireless device, data for the direct communication to the second wireless device at the transmission timing for the direct communication.

The data for the direct communication may be transmitted via a subframe on an uplink resource used for a communication with the base station.

The data for the direct communication may be transmitted via a subframe on a downlink resource used for a communication with the base station.

The subframe on the downlink resource may include at least one guard symbol.

The subframe on the downlink resource may include at least one punctured symbol.

The subframe on the downlink resource may use extended cyclic prefix (CP).

In another aspect, a method for transmitting data between wireless devices in a wireless communication system is provided. The method comprises: acquiring, by a first wireless device, uplink transmission timing with a base station; determining, by the first wireless device, transmission timing for direct communication with a second wireless device based on the uplink transmission timing with the base station; and transmitting, by the first wireless device, data for the direct communication to the second wireless device at the transmission timing for the direct communication.

In another aspect, a wireless device in a wireless communication system is provided. The wireless device comprises: a RF (Radio Frequency) unit transmitting and receiving radio signals, and a processor connected to the RF unit. The processor is configured to acquire downlink reception timing with a base station, determine transmission timing for direct communication with a neighbor wireless device based on the downlink reception timing with the base station, and transmit data for the direct communication to the neighbor wireless device at the transmission timing for the direct communication.

BRIEF DESCRIPTION OF THE DRAWINGS

FIG. 29 illustrates one example of applying time offset to a subframe for direct communication.

DETAILED DESCRIPTION OF THE INVENTION

The technology described below can be used for various multiple access schemes including CDMA (Code Division Multiple Access), FDMA (Frequency Division Multiple Access), TDMA (Time Division Multiple Access), OFDMA (Orthogonal Frequency Division Multiple Access) and SC-FDMA (Single Carrier-Frequency Division Multiple Access). CDMA can be implemented by using such radio technology as UTRA (Universal Terrestrial Radio Access) or CDMA2000. TDMA can be implemented by using such radio technology as GSM (Global System for Mobile communications)/GPRS (General Packet Radio Service)/EDGE (Enhanced Data Rates for GSM Evolution). OFDMA can be realized by using such radio technology as the IEEE 802.11 (Wi-Fi), IEEE 802.16 (WiMAX), IEEE 802.20, and E-UTRA (Evolved UTRA). UTRA is part of specifications for UMTS (Universal Mobile Telecommunications System). The 3GPP LTE is part of E-UMTS (Evolved UMTS) using E-UTRA, which uses OFDMA radio access for the downlink and SC-FDMA on the uplink. The LTE-A (Advanced) is an evolved version of the LTE.

A user equipment (UE) may be fixed or mobile and called in different terms such as a wireless device, a mobile station (MS), a user terminal (UT), a subscriber station (SS), a personal digital assistant (PDA), a wireless modem, or a hand-held device.

A base station (BS) usually refers to a fixed station communicating with a UE, which is called in different terms such as an evolved-NodeB (eNB), a base transceiver system (BTS), or an access point (AP).

In what follows, the downlink (DL) refers to a communication link from a BS to a UE while the uplink (UL) from the UE to the BS. In the DL, a transmitter may be a part of the BS while a receiver a part of the UE. In the UL, a transmitter may be a part of the UE while a receiver part of the BS.

In the description below, application of the present invention is described with reference to 3GPP LTE based on 3GPP TS (Technical Specification) release 8, or 3GPP LTE-A based on 3GPP TS release 10. The examples in the specification are only intended to illustrate the present invention and should not be understood to limit the invention, and the present invention can be applied to various wireless communication networks. In the following description, LTE refers to the wireless system including LTE and/or LTE-A.

Figure 1:
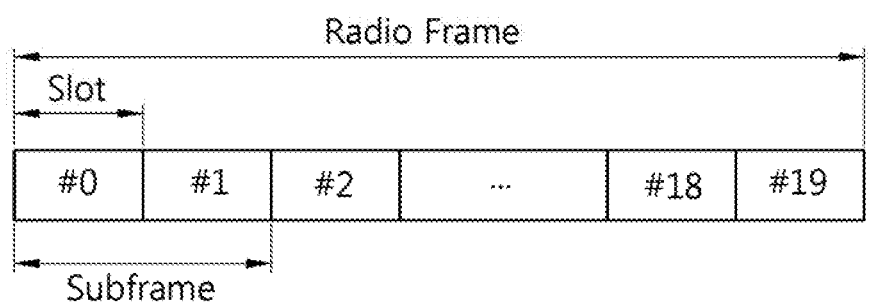
FIG. 1 illustrates a structure of a downlink radio frame in 3GPP LTE-A.

FIG. 1 illustrates a structure of a downlink radio frame in 3GPP LTE-A. The section 6 of the 3GPP TS 36.211 V10.4.0 (2012-December) "Evolved Universal Terrestrial Radio Access (E-UTRA); Physical Channels and Modulation (Release 10)" may be incorporated herein by reference.

A radio frame consists of 10 subframes indexed with 0 to 9. One subframe consists of two consecutive slots. A time required for transmitting one subframe is defined as a transmission time interval (TTI). For example, one subframe may have a length of 1 ms and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink multiple access scheme, the OFDM symbol is only for expressing one symbol period in the time domain, and there is no limitation in a multiple access scheme or terminologies. For example, the OFDM symbol may also be called in different terms such as a single carrier frequency division multiple access (SC-FDMA) symbol when SC-FDMA is used in the uplink multiple access scheme. A resource block (RB) includes multiple consecutive subcarriers at one slot in the unit of resource allocation.

The example of the structure of a wireless frame in FIG. 1 is just one example. Therefore, the number of subframes included in the wireless frame, the number of slots included in the subframe, or the number of OFDM symbols included in the slot can be variously determined. 3GPP LTE defines that one slot includes 7 OFDM symbols in normal cyclic prefix (CP), and one slot includes 6 OFDM symbols in extended CP.

Figure 2:
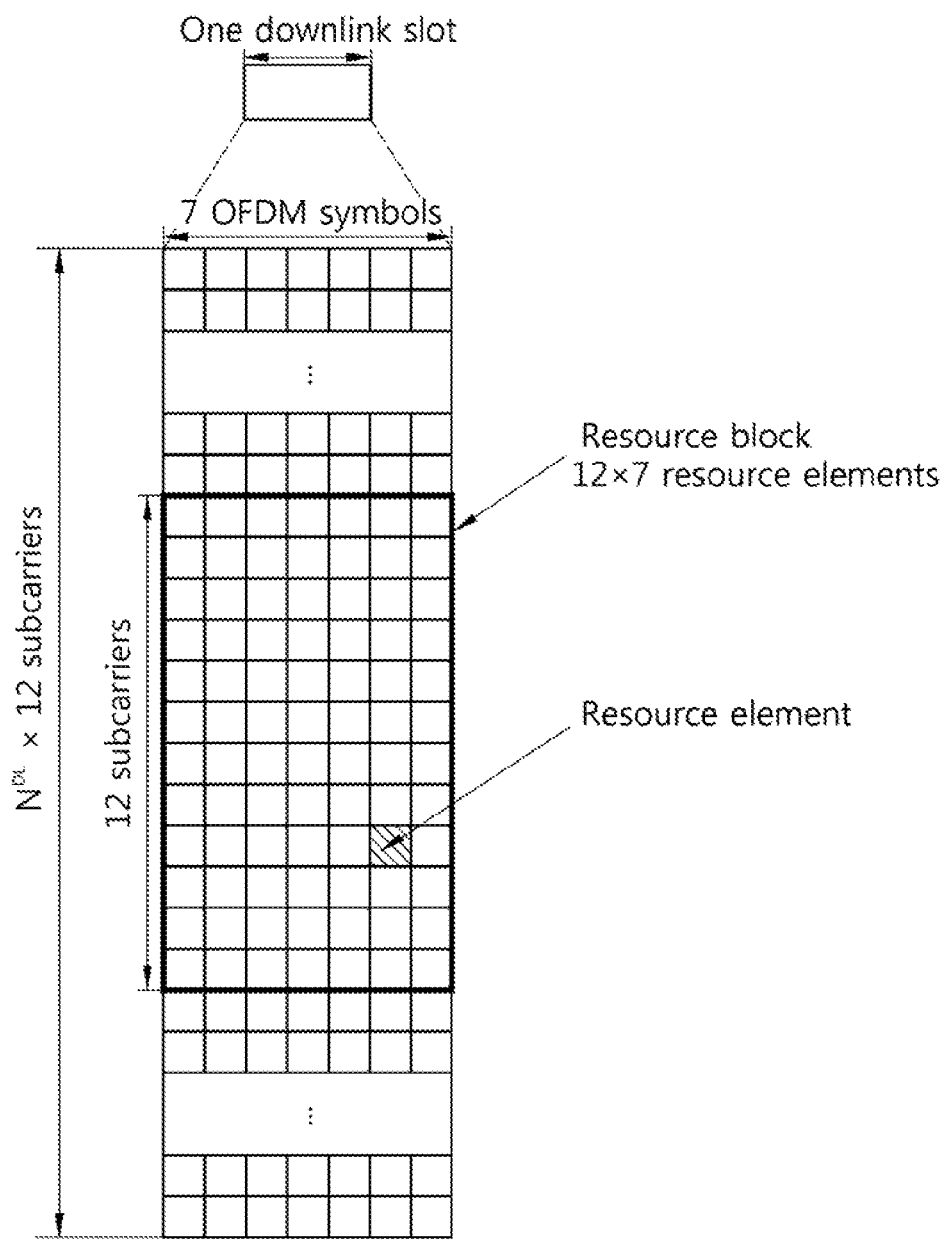
FIG. 2 illustrates an example of a resource grid for one downlink slot.

FIG. 2 illustrates an example of a resource grid for one downlink slot.

The downlink slot includes multiple OFDM symbols in time domain, and $N_{RB}$ resource blocks in frequency domain. The number of resource blocks included in the downlink slot, $N_{RB}$, depends on the downlink transmission bandwidth configured at the cell. In LTE system, for example, $N_{RB}$ can be one from 6 to 110. One resource block includes multiple subcarriers in frequency domain. The structure of the uplink slot can be the same as that of the downlink slot.

Each element on the resource grid is called a resource element (RE). The element on the resource grid can be identified by the index pair (k, l) in the slot. Here, k (k=0, . . . , $N_{RB} \times 12-1$) is the subcarrier index in frequency domain, and l (l=0, . . . , 6) the OFDM symbol index in time domain.

Although one resource block is described to include 7×12 resource element composed of 7 OFDM symbols in time domain and 12 subcarriers in frequency domain in this specification, the example is for the purpose of illustration only and is not intended to limit the number of OFDM symbols and subcarriers in the resource block. The number of OFDM symbols and subcarriers can be variously modified depending on the length of CP, frequency spacing, etc.

Figure 3:
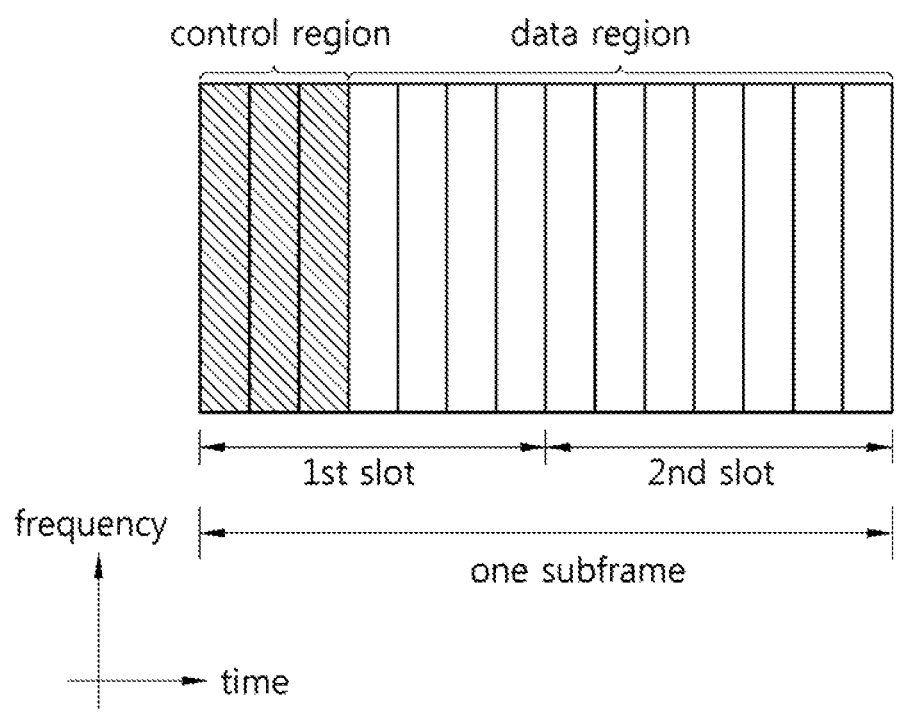
FIG. 3 illustrates a structure of a downlink subframe.

FIG. 3 illustrates a structure of a downlink subframe.

DL (downlink) subframe is divided into a control region and a data region in time domain. The control region includes maximum of 4 preceding OFDM symbols of the first slot in the subframe, though the number of OFDM symbols included in the control region can be changed. In the control region, Physical Downlink Control Channel (PDCCH) and other control channels are allocated, and in the data region, Physical Downlink Shared Channel (PDSCH) is allocated.

As disclosed in the 3GPP TS 36.211 V10.4.0, the 3GPP LTE/LTE-A defines a physical channel, including a PDCCH, a Physical Control Format Indicator Channel (PCFICH), and a Physical Hybrid-ARQ Indicator Channel (PHICH). Also, control signals transmitted from a physical layer include a Primary Synchronization Signal (PSS), a Secondary Synchronization Signal (SSS), and a random access preamble.

The PSS is carried by the last OFDM symbol of a first slot (first slot of a first subframe (subframe with index 0)) and the 11th slot (first slot of a sixth subframe (subframe with index 5)). The PSS is used for obtaining OFDM symbol synchronization or slot synchronization, and associated with a physical cell identify (ID). A Primary Synchronization Code (PSC) is a sequence used for the PSS and the 3GPP LTE defines three PSCs. According to the cell ID, one from among the three PSCs is transmitted to the PSS. The same PSC is used for each of the last OFDM symbols of the first and the $11^{th}$ slot.

The SSS is divided into a first and a second SSS. The first and the second SSS are carried by an OFDM symbol adjacent to the OFDM symbol carrying the PSS. The SSS is used for obtaining frame synchronization. The SSS is used for obtaining cell ID together with the PSS. The first and the second SSS use Secondary Synchronization Codes (SSCs) different from each other. In case the first and the second SSS carry 31 sub-carriers respectively, two SSC sequences of length 31 are used for the first and the second SSS, respectively.

The PCFICH transmitted in the first OFDM symbol of a subframe carries control format indicator (CFI) which indicates the number of OFDM symbols (namely, size of the control region) used for carrying control channels within a subframe. The UE first receives the CFI through the PCFICH and monitors the PDCCH. The PCFICH does not use blind decoding but transmitted through the fixed PCFICH resources of a subframe.

The PDCCH carries control information which is called downlink control information (DCI). DCI may include resource allocation of PDSCH (which is also called DL grant), resource allocation of PUSCH (which is called UL grant), and activation of a set of transmission power control commands for individual UEs within a UE group and/or voice over internet protocol (VoIP).

The PHICH carries ACK (positive acknowledgement)/NACK (negative acknowledgement) signal for UL hybrid automatic repeat request (HARQ). The ACK/NACK signal about the UL data on the PUSCH transmitted by the UE is transmitted through the PHICH.

Figure 4:
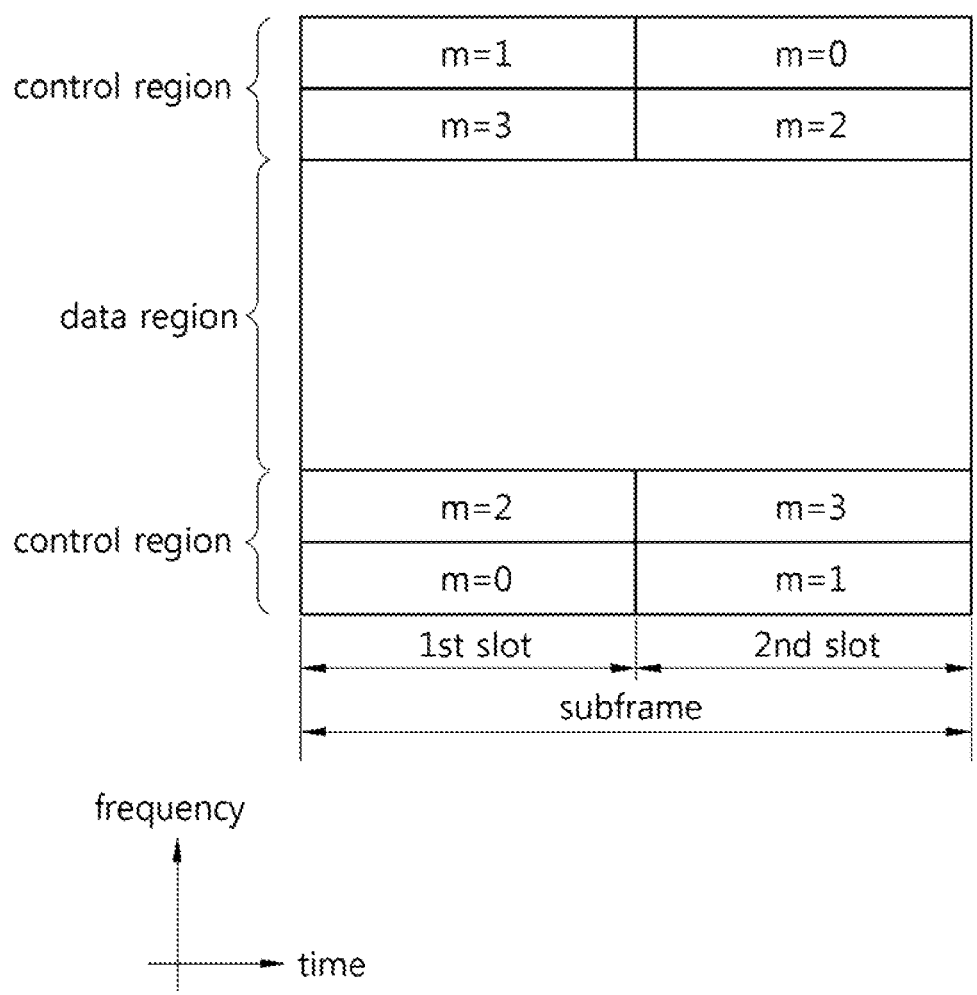
FIG. 4 illustrates a structure of an uplink subframe.

FIG. 4 illustrates a structure of an uplink subframe.

The uplink subframe can be divided into a control region and a data region in frequency domain. To the control region is allocated Physical Uplink Control Channel (PUCCH) for uplink control information to be transmitted. To the data region is allocated Physical Uplink Shared Channel (PUSCH) for data to be transmitted.

PUCCH for one terminal is allocated to the resource block pair (RB pair) at the subframe. The resource blocks belonging to the resource block pair occupy subcarriers which are different each other at the first and second slots. The frequency occupied by the resource blocks belonging to the resource block pair allocated to PUCCH is changed based on the slot boundary. In this process, it is that RB pair allocated to PUCCH is frequency-hopped at the slot boundary. By transmitting the uplink control information through different subcarriers according to the time by the terminal, frequency diversity gain can be obtained. The location index, m, represents the logical frequency domain location of the resource block pair allocated to PUCCH at the subframe.

The uplink control information transmitted on PUCCH includes HARQ ACK/NACK, channel quality indicator (CQI) representing downlink channel state, and scheduling request (SR) which is an uplink wireless resource allocation request.

Now, a reference signal will be described.

A reference signal (RS) is usually transmitted in the form of a sequence. A reference signal sequence may employ a random sequence without being limited by particular conditions. The reference signal sequence may employ a PSK (Phase Shift Keying)-based computer generated sequence. Examples of the PSK include binary phase shift keying (BPSK), quadrature phase shift keying (QPSK), and so on. Similarly, the reference signal sequence may employ constant amplitude zero auto-correlation (CAZAC) sequence. Examples of the CAZAC sequence include Zadoff-Chu (ZC)-based sequence, ZC sequence with cyclic extension, ZC sequence with truncation, and so on. Meanwhile, the reference signal sequence may employ a pseudo-random (PN) sequence. Examples of the PN sequence include m-sequence, computer-generated sequence, gold sequence, Kasami sequence, and so on. Also, the reference signal sequence may employ a cyclically shifted sequence.

A DL reference signal can be classified into a cell-specific RS (CRS), multimedia broadcast and multicast single frequency network (MBSFN) RS, UE-specific RS, positioning RS (PRS), and channel state information (CSI) RS. The CRS is an RS transmitted to all the UEs within a cell, which can be used for channel measurement about CQI feedback and channel estimation about the PDSCH. The MBSFN RS can be transmitted from a subframe allocated for MBSFN transmission. The UE-specific RS is an RS received by a particular UE or a particular UE group within a cell, which may be called a demodulation RS (DM-RS). The DM-RS is mostly used for a particular UE or a particular UE group to perform data demodulation. The PRS may be used for position estimation of the UE. CSI-RS is used for channel estimation for the PDSCH of the LTE-A UE. The CSI-RS is disposed in a relatively sparse fashion in the spectral or temporal region, and can be punctured in a general subframe or data region of the MBSFN subframe. In case of need for estimating CSI, the UE may report CQI, PMI, RI, etc.

The CRS is transmitted from all the DL subframes within a cell supporting PDSCH transmission. The CRS can be transmitted through the antenna port 0 to 3, and the CRS may be defined only for $\Delta f=15$ kHz. The CSI-RS may refer to the Section 6.10.1 of the 3GPP TS 36.211 V10.4.0 (2012-December).

Figure 5:
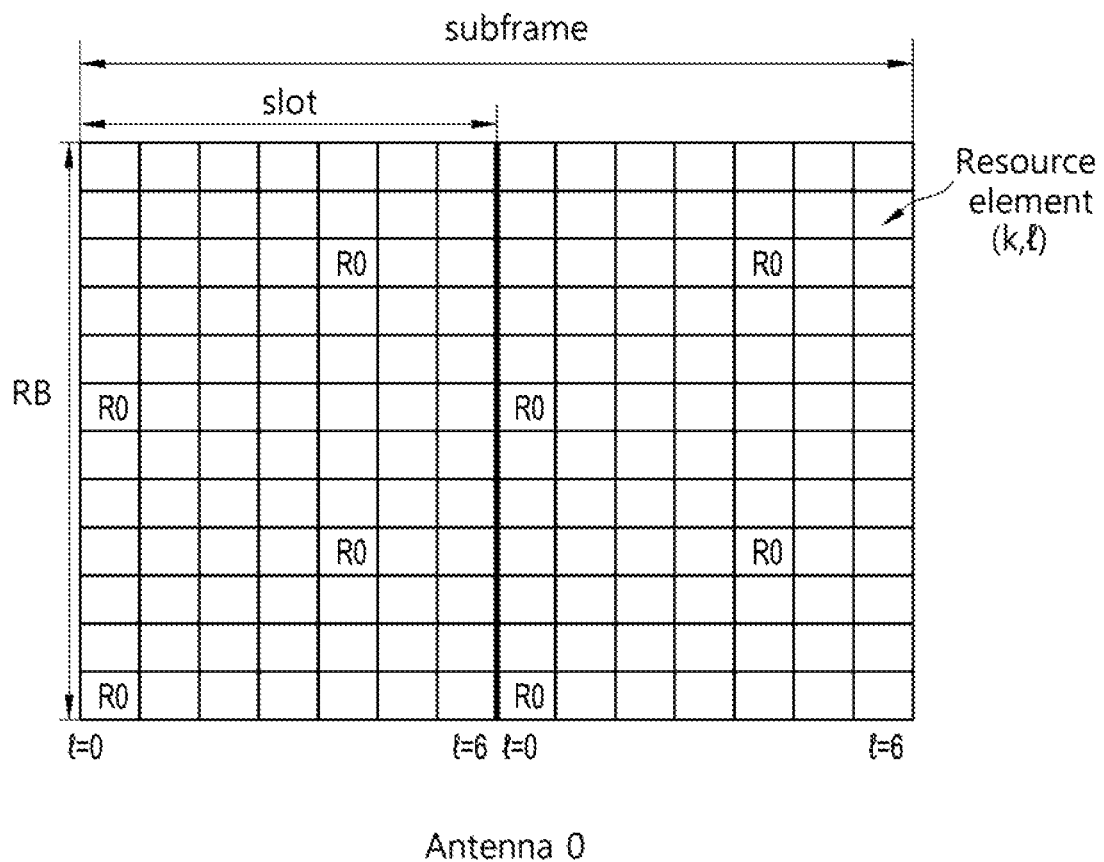
FIGS. 5 to 7 illustrate one example of an RB on which a CRS is mapped.
Figure 6:
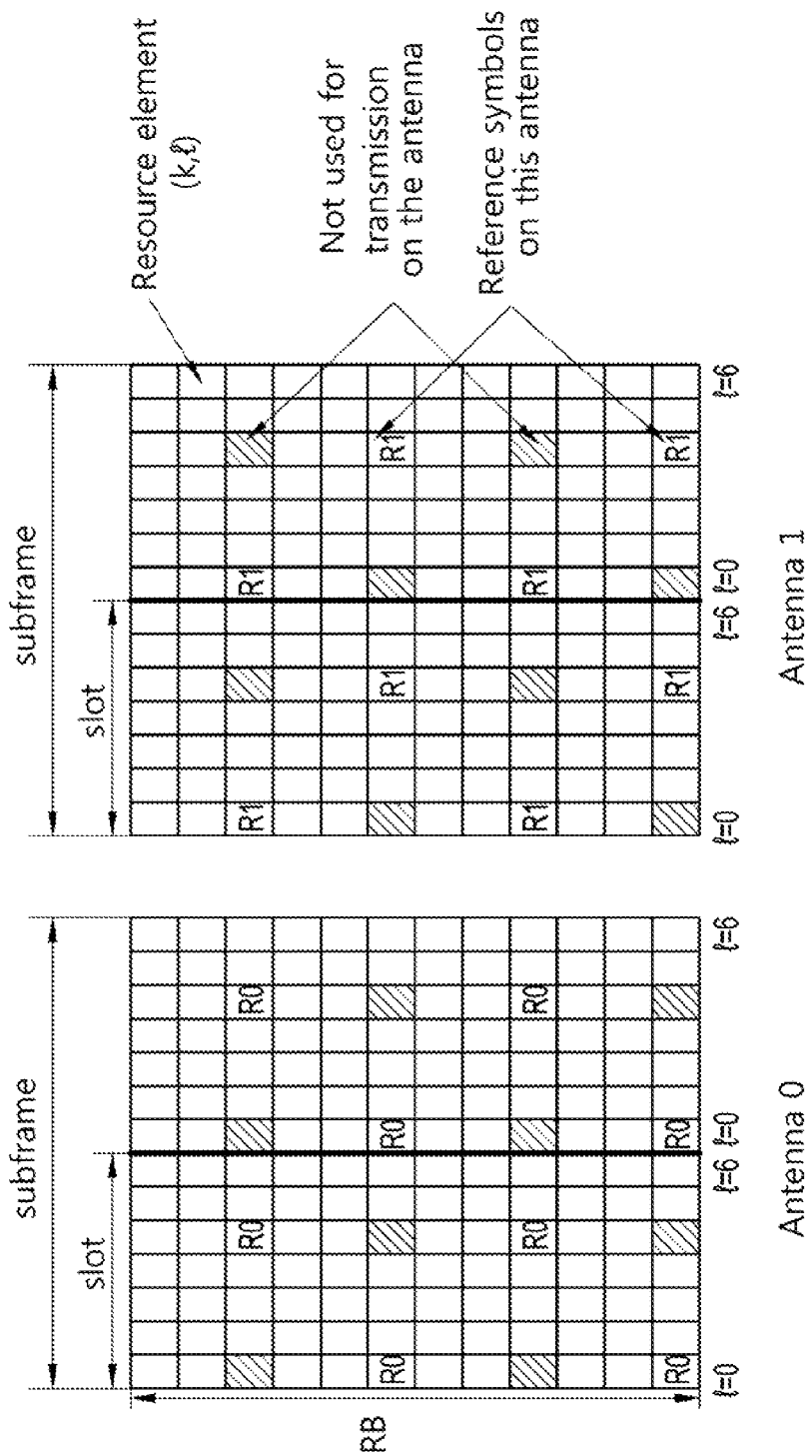
Figure 7:
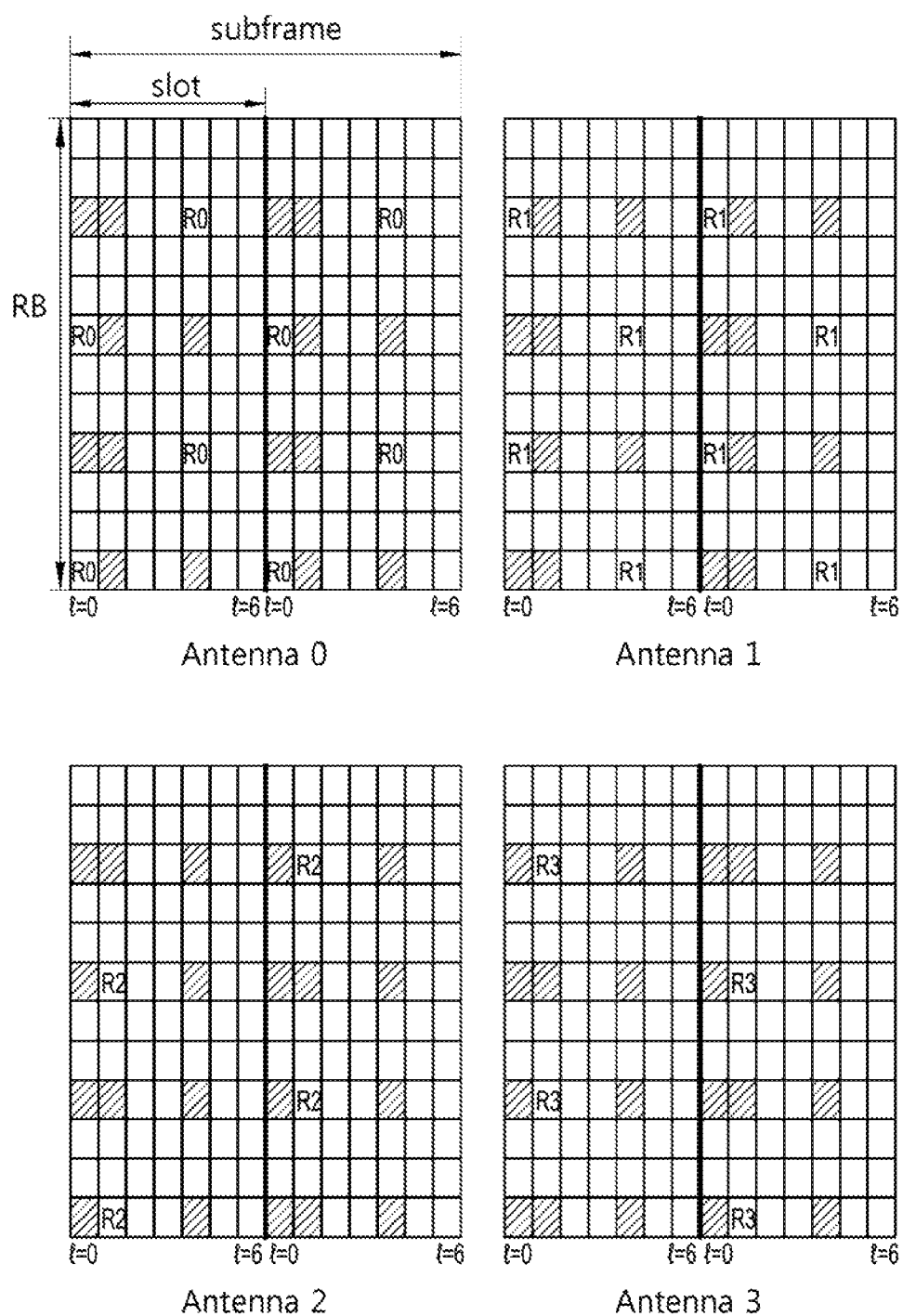

FIGS. 5 to 7 illustrate one example of an RB on which a CRS is mapped.

FIG. 5 is one example of a pattern in which the CRS is mapped onto the RB in case the BS uses a single antenna port;

FIG. 6 for the case where the BS uses two antenna ports; FIG. 7 for the case where the BS uses four antenna ports. Also, the CRS pattern may be used for supporting the characteristics of the LTE-A. For example, the CRS pattern may be used for supporting the characteristics such as coordinated multi-point (CoMP) transmission and reception method; or spatial multiplexing. Also, the CRS may be used for channel quality measurement, CP detection, time/frequency synchronization, etc.

With reference to FIGS. 5 to 7, in case of multi-antenna transmission where the BS uses a plurality of antenna ports, one resource grid is allocated to each antenna port. 'R0' denotes a RS for a first antenna port; 'R1" for a second antenna port; 'R2' for a third antenna port; and 'R3' for a fourth antenna port. Positions of R0 to R3 within a subframe do not overlap with each other. l is the position of the OFDM symbol within a slot, whose value ranges from 0 to 6 for a normal CP. The RS for each antenna port in one OFDM symbol is placed at interval of six sub-carriers. The number of R0 within the subframe is the same as the number of R1 and the number of R2 and the number of R3 are the same to each other. The number of R2 and R2 within the sub-frame is less than the number of R0 and R1. A resource element used for the RS of one antenna port is not used as an RS for another antenna, which is intended not to cause interference between antenna ports.

CRSs as many as the number of antenna ports are always transmitted irrespective of the number of streams. The CRS has an independent reference signal for each antenna port. The position of the CRS in the frequency and time domain within a subframe is determined independently of the UE. Also, a CRS sequence multiplied to the CRS is generated independently of the UE. Therefore, all the UEs within a cell can receive the CRS. However, the position of the CRS within the subframe and the CRS sequence may be determined according to the cell ID. The position of the CRS in the time domain within the subframe may be determined according to the antenna port number and the number of OFDM symbols within the resource block. The position of the CRS in the frequency domain within the subframe may be determined according to the antenna number, cell ID, OFDM symbol index (l), slot number within a radio frame, and so on.

The CRS sequence may be applied in units of OFDM symbols within one subframe. The CRS sequence may vary depending on the slot number within one radio frame, OFDM symbol index within the slot, type of CP, and so on. The number of RS subcarriers for each antenna port in one OFDM symbol is 2. If it is assumed that a subframe contains $N_{RB}$ resource blocks in the frequency domain, the number of RS subcarriers for each antenna in one OFDM symbol becomes $2 \times N_{RB}$. Therefore, length of the CRS sequence becomes $2 \times N_{RB}$.

Equation 1 represents one example of a CRS sequence r(m)

$$r(m) = \frac{1}{\sqrt{2}}(1 - 2 \cdot c(2m)) + j\frac{1}{\sqrt{2}}(1 - 2 \cdot (2m+1)), \quad \text{<Equation 1>}$$

where m is $0, 1, \ldots, 2N_{RB}^{max}-1$. $2N_{RB}^{max}$ is the number of resource blocks corresponding to the maximum bandwidth. For example, $2N_{RB}^{max}$ is 110 in the 3GPP LTE. c(i) is a PN sequence, which is a simulated, random sequence, and can be defined by a gold sequence of length−31. Equation 2 represents one example of the gold sequence c(n).

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2, \quad \text{<Equation 2>}$$

where Nc=1600; $x_1(i)$ is a first m-sequence; $x_2(i)$ is a second m-sequence. For example, the first and the second m-sequence may be initialized for each OFDM symbol according to cell ID, slot number within one radio frame, OFDM symbol index within the slot, type of CP, and so on.

In case of a system having bandwidth less than $2N_{RB}^{max}$, only a predetermined part with length of $2 \times N_{RB}$ may be selected and used from the RS sequence with length of $2 \times 2N_{RB}^{max}$.

Frequency hopping may be applied to the CRS. A frequency hopping pattern may take one radio frame (10 ms) for its period and each frequency hopping pattern corresponds to one cell ID group.

The DM-RS is provided for the PDSCH transmission and is transmitted on the antenna port p=5, p=7, 8, or p=7, 8, . . . , v+6. At this time, v denotes the number of layers used for the PDSCH transmission. The DM-RS is transmitted to one UE through any one of antenna ports belonging to a set S, where S={7, 8, 11, 13} or S={9, 10, 12, 14}. The DM-RS exists and is valid for demodulation of the PDSCH only when transmission of the PDSCH is associated with the corresponding antenna port. The DM-RS is transmitted only at the RBs to which the corresponding PDSCH is mapped. The DM-RS is not transmitted at resource elements through which either a physical channel or a physical signal is transmitted, irrespective of antenna ports. The DM-RS may refer to the Section 6.10.3 of the 3GPP TS 36.211 V10.4.0 (2012-12).

Figure 8:
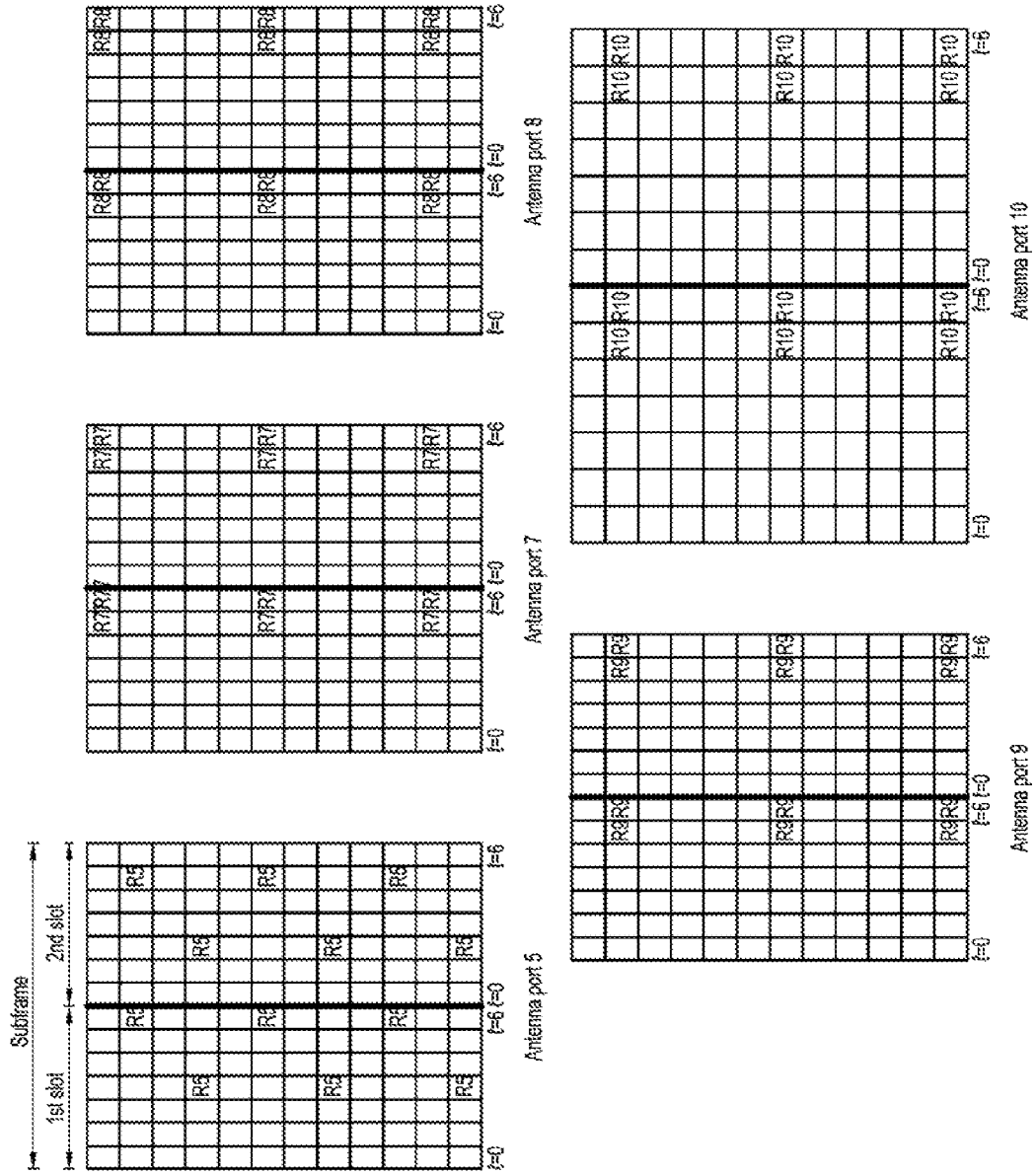
FIG. 8 is one example of an RB to which a DM-RS is mapped.

FIG. 8 is one example of an RB to which a DM-RS is mapped.

FIG. 8 illustrates resource elements used for the DM-RS in the normal CP structure. Rp denotes a resource element used for DM-RS transmission through the antenna port p. For example, R5 denotes a resource element to which the DM-RS for the antenna port 5 is transmitted. Also, with reference to FIG. 8, the DM-RS for the antenna port 7 and 8 is transmitted through the resource element corresponding to a first, sixth, and eleventh subcarrier (subcarrier index 0, 5, 10) of a sixth and seventh OFDM symbol (OFDM symbol index 5, 6) of each slot. The DM-RS for the antenna port 7 and 8 can be distinguished by an orthogonal sequence of length 2. The DM-RS for the antenna port 9 and 10 is transmitted through the resource element corresponding to a second, seventh, and twelfth subcarrier (subcarrier index 1, 6, 11) of a sixth and seventh OFDM symbol (OFDM symbol index 5, 6) of each slot. The DM-RS for the antenna port 9 and 10 can be distinguished by an orthogonal sequence of length 2. Also, since S={7, 8, 11, 13} or S={9, 10, 12, 14}, the DM-RS for the antenna port 11 and 13 is mapped to the resource element to which the DM-RS for the antenna port 7 and 8 is mapped while the DM-RS for the antenna port 12 and 14 is mapped to the resource element to which the DM-RS for the antenna port 9 and 10 is mapped.

The CSI-RS is transmitted through 1, 2, 4, or 8 antenna ports. The antenna ports used for this case correspond to p=15, p=15, 16, p=15, . . . , 18, and p=15, . . . , 22. The CSI-RS can be defined only for Δf=15 kHz. The CSI-RS may refer to the Section 6.10.3 of the 3GPP TS 36.211 V10.1.0 (2012-December).

For transmission of the CSI-RS, up to 32 different configurations from each other can be employed to reduce inter-cell interference (ICI) in a multi-cell environment as well as a heterogeneous network environment. Configurations for the CSI-RS differ from each other according to the number of antenna ports and CP within a cell; and adjacent cells may assume configurations different from each other as possibly as can be. Also, the CSI-RS configurations can be divided into the cases of being applied to both frequency division duplex (FDD) and time division duplex (TDD) frame and only to TDD frame according to frame structure. A plurality of CSI-RS configurations may be used for a single cell. For the UE assuming non-zero transmission power may employ 0 or 1 CSI configuration while the UE assuming zero transmission power may employ 0 or several CSI configurations. The UE does not transmit the CSI-RS for a special subframe of TDD frame; a subframe where transmission of the CSI-RS collides with a synchronization signal, a physical broadcast channel (PBCH), and system information block type 1; or a subframe to which a paging message is transmitted. In addition, in a set S where S={15}, S={15, 16}, S={17, 18}, S={19, 20} or S={21, 22}, the resource element to which the CSI-RS for one antenna port is transmitted is not used for transmission of the CSI-RS for the PDSCH or another antenna port.

Figure 9:
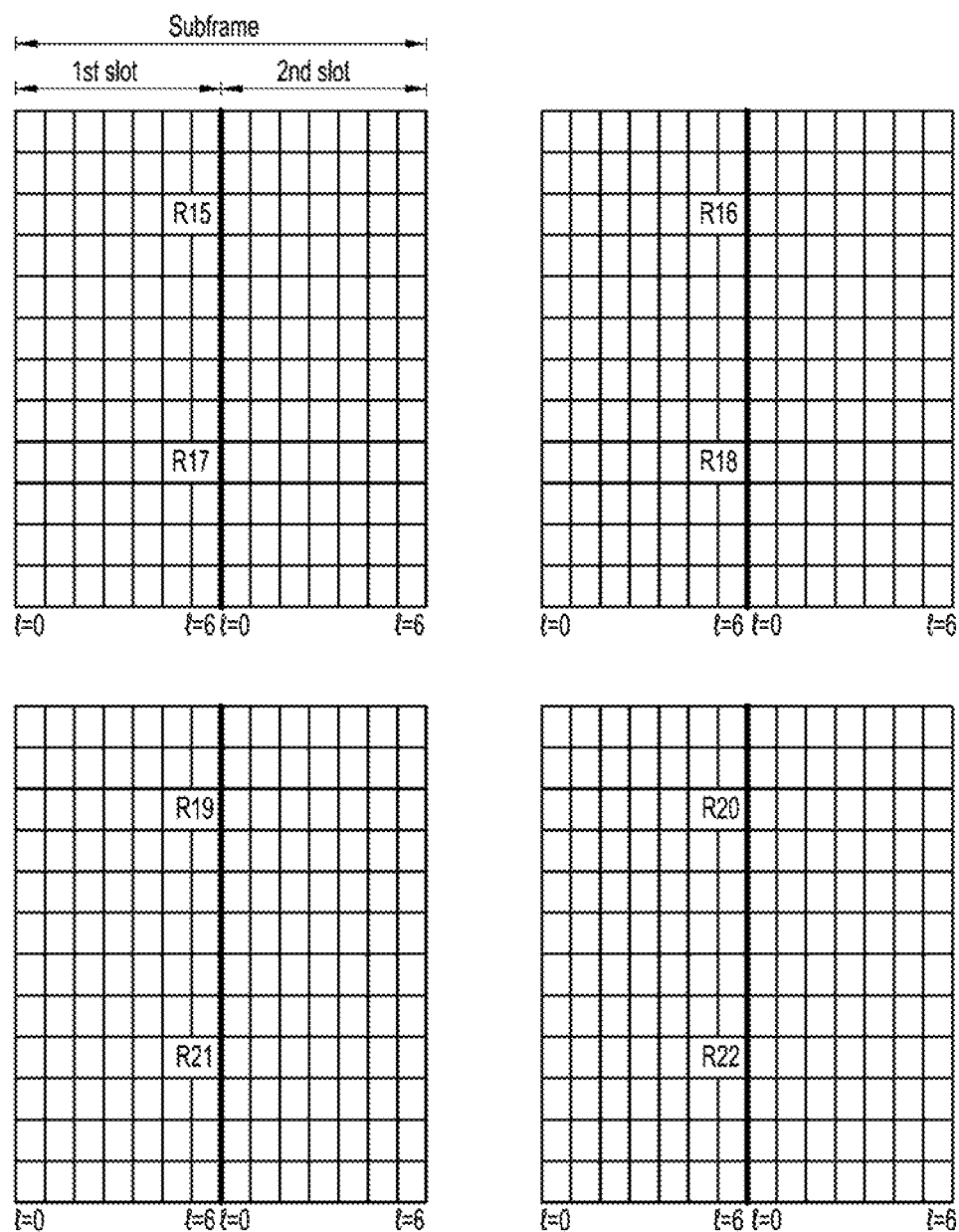
FIG. 9 is one example of an RB to which a CSI-RS is mapped.

FIG. 9 is one example of an RB to which a CSI-RS is mapped.

FIG. 9 illustrates resource elements used for the CSI-RS in the normal CP structure. Rp denotes a resource element used for CSI-RS transmission through the antenna port p. With reference to FIG. 9, the CSI-RS for the antenna port 15 and 16 is transmitted through the resource element corresponding to a third subcarrier (subcarrier index 2) of a sixth and seventh OFDM symbol (OFDM symbol index 5, 6) of a first slot. The CSI-RS for the antenna port 17 and 18 is transmitted through the resource element corresponding to a ninth subcarrier (subcarrier index 8) of a sixth and seventh OFDM symbol (OFDM symbol index 5, 6) of a first slot. The CSI-RS for the antenna port 19 and 20 is transmitted through the same resource element to which the CSI-RS for the antenna port 15 and 16 is transmitted while the CSI-RS for the antenna port 21 and 22 is transmitted through the same resource element to which the CSI-RS for the 17 and 18 is transmitted.

Figure 10:
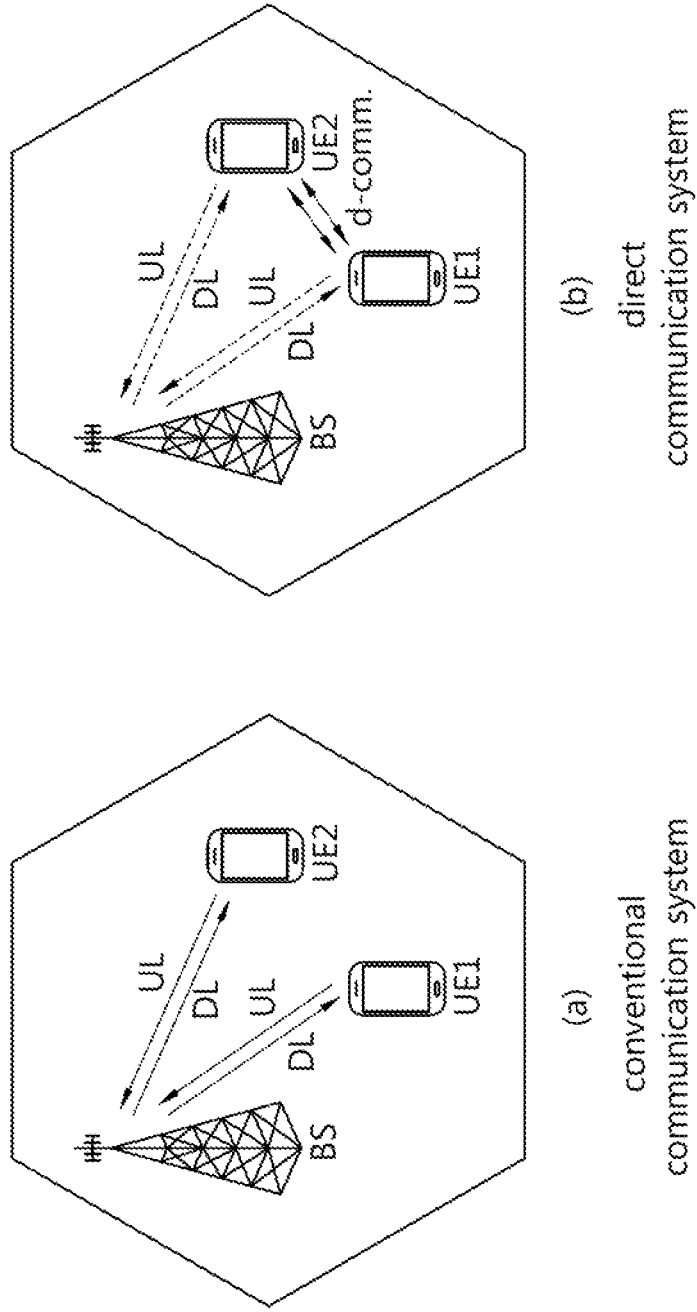
FIG. 10 illustrates a conventional wireless communication system and a direct communication system.

Meanwhile, direct communication means a communication method for performing transmission and reception between UEs without the relay of a BS, directly. FIG. 10 illustrates a conventional wireless communication system and a direct communication system.

Referring to FIG. 10, UEs in a conventional communication system always communicate with a BS. On the other hand, the UE in a direct communication system can communicate with other UE in addition to a BS. Direct communication is preferably carried out when UEs are in geographically neighboring region or channel state between UEs is good. When direct communication is carried out, controls on UEs are still performed by the BS (dotted line). On the other hand, actual data or information related to the actual data (e.g. HARQ, management/control information of direct communication network) is communicated through direct communication between UEs (solid line).

The BS instructs UEs to perform direct communication for establishing link for UEs which want direct communication, and determines resources for the direct communication. The BS informs all UE or a primary UE, which the BS determines from all the UEs, of the resources allocated for direct communication. Then, UEs can perform direct transmission and reception of data under the control of the BS but without relay of the BS.

Although all data can be transmitted and received through direct link between UEs, as described in the above, it is preferable to transmit and receive only actual data and minimal control information related to the data between UEs, and to transmit and receive other control information through the BS. In other words, connection and communication with the BS are not excluded even when direct communication between UEs is performed. For example, direct communication request/response information, scheduling information such as resource allocation information, security information, and other information needed for direct communication can be transmitted and received through the BS.

Figure 11:
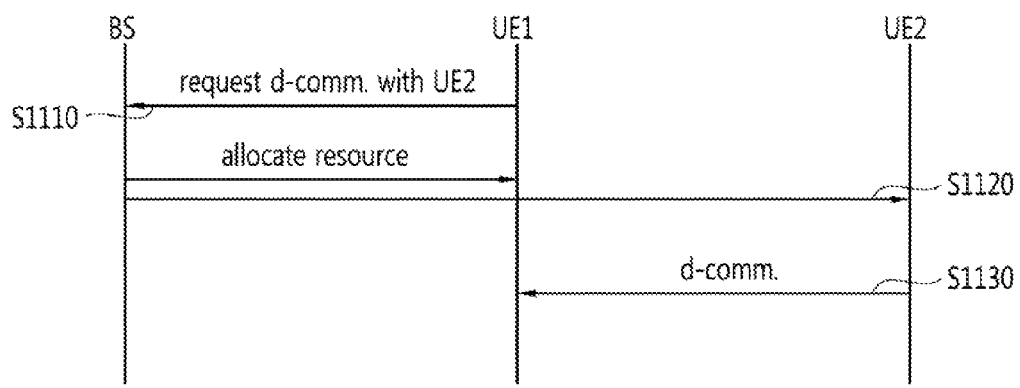
FIG. 11 is a flow diagram illustrating one example of direct communication between user equipments (UEs).

FIG. 11 is a flow diagram illustrating one example of direct communication between user equipments (UEs).

First, UE 1 requests direct communication with UE 2 to the BS (S1110). The request can be made by the BS first, or UE 1 can directly request to UE 2. Also, direct communication can be started without request on a contention basis.

The BS allocates downlink and/or uplink resource for direct communication between UE 1 and UE 2 (S1120). At this step, resource allocation for UE 1 and UE 2 can be signaled to each UE independently or commonly signaled.

Before the step S1120, the step that the BS queries UE 2 on the initiation of direct communication and responses the result to UE 1 can be added.

Then, UE 1 and UE 2 perform direct communication by using allocated resource (S1130).

The steps in FIG. 11 are represented for the convenience of description, and the order of the steps can be changed depending on the scheduling of the BS and the state of each UE, and additional control signals and measurement signals can be transmitted and received between the BS and UEs.

In the description below, the method for acquiring transmission and reception timing, and/or synchronization between UEs in this direct communication system will be described. In the description of the specification, timing can mean the transmission timing for transmitting a transmission signal, the timing for determining subframe boundary of a transmission signal, the reception timing for detecting a reception signal, or the time for determining subframe boundary of a reception signal.

Also, for the convenience of explanation, the application of the present invention is described based on FDD direct communication system. This application, however, is for the purpose of illustration only, and the present invention can also be applied to TDD direct communication system.

Also, for the convenience of explanation, it is assumed that the DL subframe boundary and UL subframe boundary of the BS are aligned based on absolute time. This assumption, however, is for the purpose of illustration only, and the present invention can be applied to the case where the DL subframe boundary and UL subframe boundary are different each other.

In conventional wireless communication system, UE acquires DL reception timing by using DL synchronization signal of the BS. Then, initial transmission timing for UL is set from the acquired DL subframe boundary, and UL transmission timing is acquired through random access.

Figure 12:
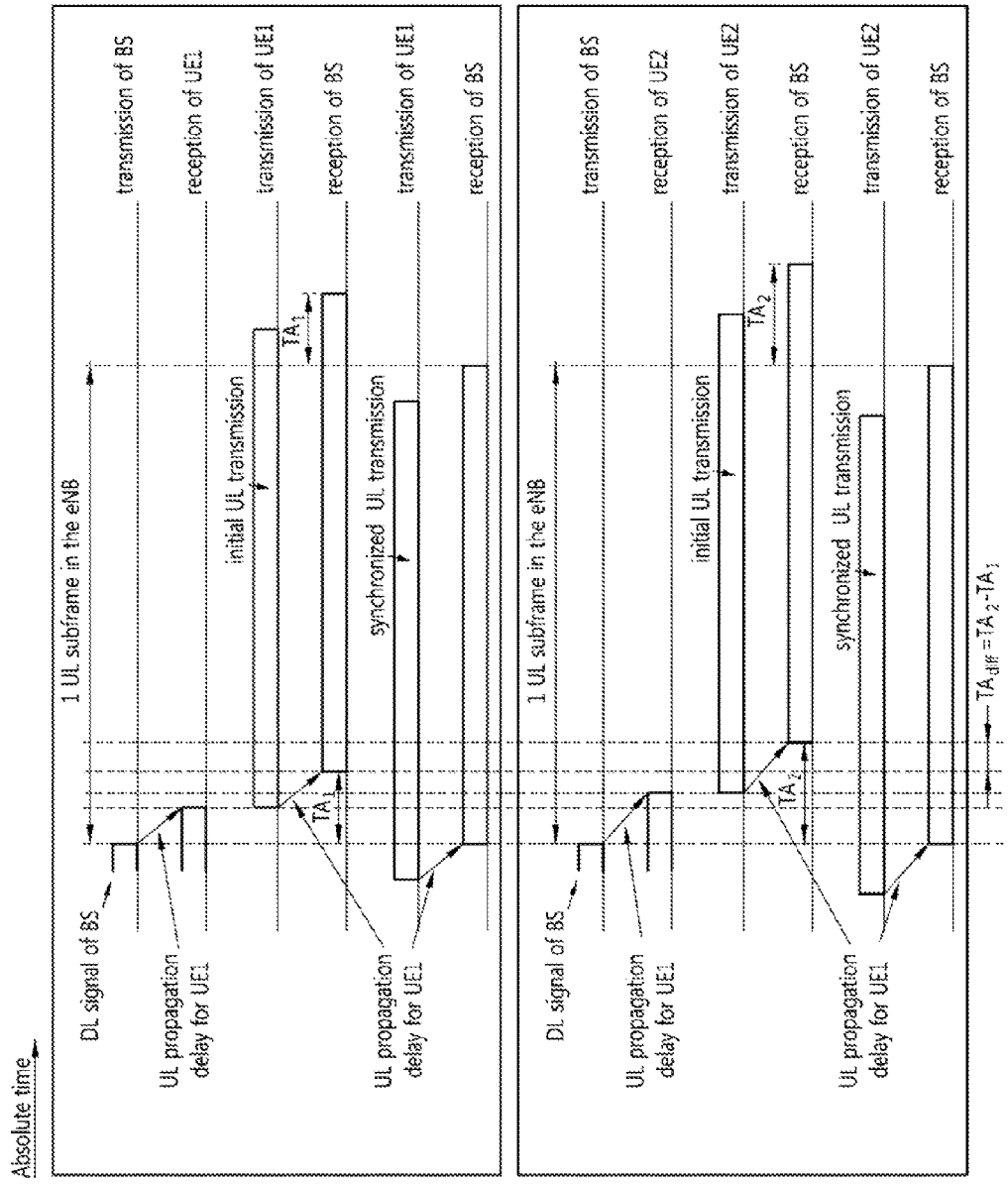
FIG. 12 illustrates an example of acquiring DL reception timing and UL transmission timing in general wireless communication.

FIG. 12 illustrates an example of acquiring DL reception timing and UL transmission timing in general wireless communication.

Referring to FIG. 12, the BS transmits DL signal to UE 1. UE 1 receives the DL signal with DL propagation delay according to the distance from the BS. UE 1 can acquire DL reception timing based on the DL synchronization signal.

Then, UE 1 performs initial random access procedure to acquire uplink transmission timing. UE 1, assuming that UL transmission timing is the same as DL reception timing, performs Physical Random Access Channel (PRACH) transmission. At this step, the offset between DL reception timing and UL transmission timing can be defined in advance. In other words, system can be configured so that UL subframe boundary is distanced from DL subframe boundary by predetermined offset.

Then, the BS receives random access preamble with UL propagation delay according to the distance from the UE 1. Therefore, the BS receives random access preamble with the delay corresponding to the sum of DL propagation delay and UL propagation delay. At this step, the BS estimates the total delay by PRACH detection to instruct UL transmission timing to the UE 1. This is called 'timing advance (TA)'.

The same procedure can be performed for UE 2. Referring to FIG. 12, UE 2 is assumed to be located at the location which is relatively far from the BS compared to UE 1. In other words, DL propagation delay and UL propagation delay of UE 2 is larger than those of UE 1. $TA_{diff}$ a represents the difference between UL transmission timings of the two UEs.

Figure 13:
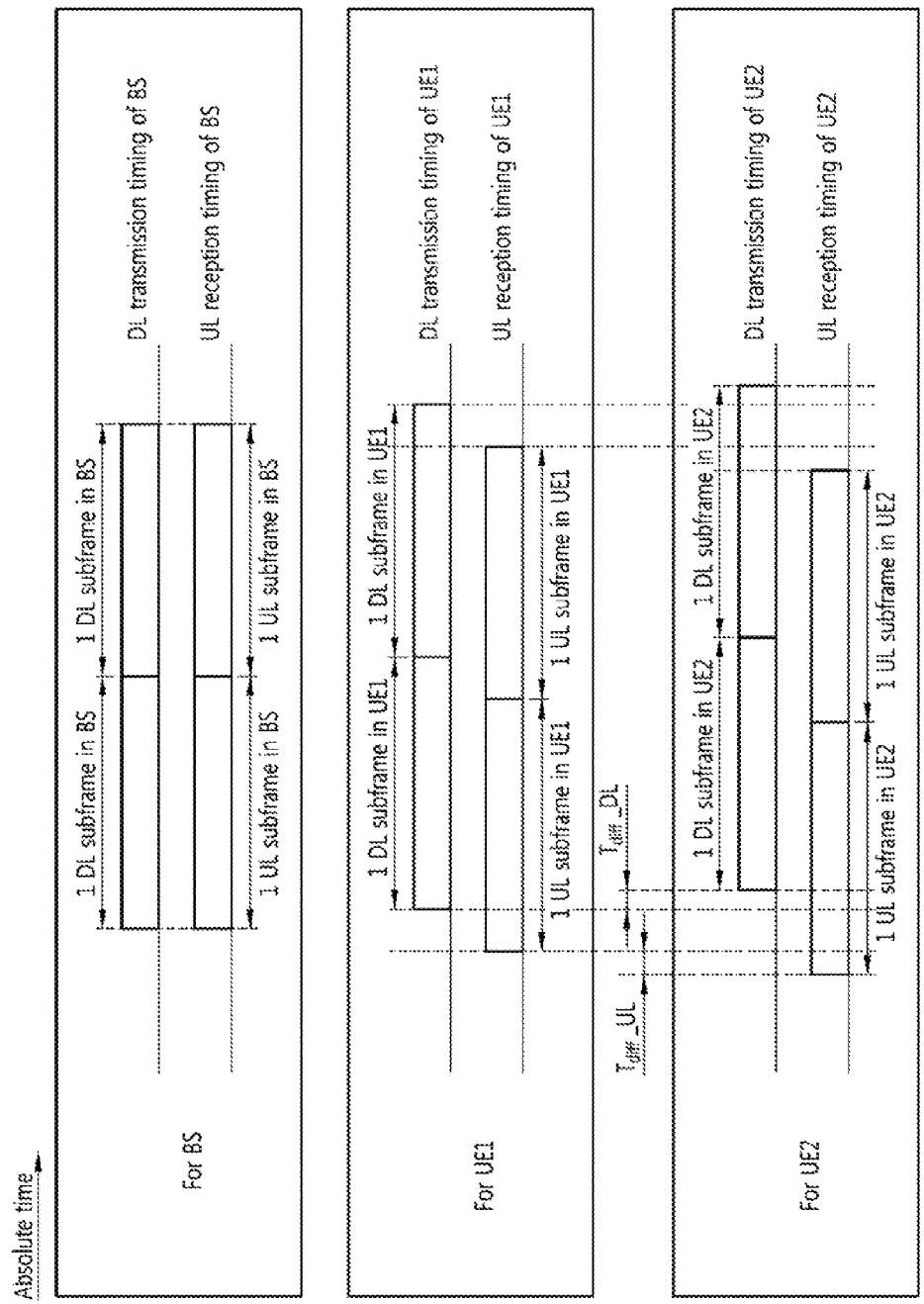
FIG. 13 illustrates the DL reception timing and the UL transmission timing of each entity in the example of FIG. 12.

FIG. 13 illustrates the DL reception timing and the UL transmission timing of each entity in the example of FIG. 12.

In the example of FIG. 12, as described above, UE 2, which is located relatively far from the BS compared to UE 1, has larger DL propagation delay and UL propagation delay. Therefore, referring to FIG. 13, the DL reception timing of UE 2 is located behind the DL reception timing of UE 1, and the UL transmission timing of UE 2, on the other hand, is located ahead of transmission timing of UE 1.

The method for configuring/acquiring d-DL (direct-DL) and d-UL (direct-UL) timing for direct communication based on the DL and UL timing which the UE has acquired through the process described above will be described below. In the below, unless specifically mentioned, DL and UL mean conventional downlink and uplink of communication with the BS, and d-DL and d-UL mean downlink and uplink of direct communication between UEs. The d-DL refers to a reception link from one UE to another UE, and the d-UL refers to a transmission link from one UE to another UE. Also, for the convenience of description, d-DL reception and d-UL transmission will be explained in the unit of subframe. This explanation, however, is for the purpose of illustration only, and d-DL reception and d-UL transmission can be performed in the unit of slot or OFDMA symbol (or SC-FDMA symbol, discrete Fourier transform spread (DFT-S) OFDMA symbol).

Figure 14:
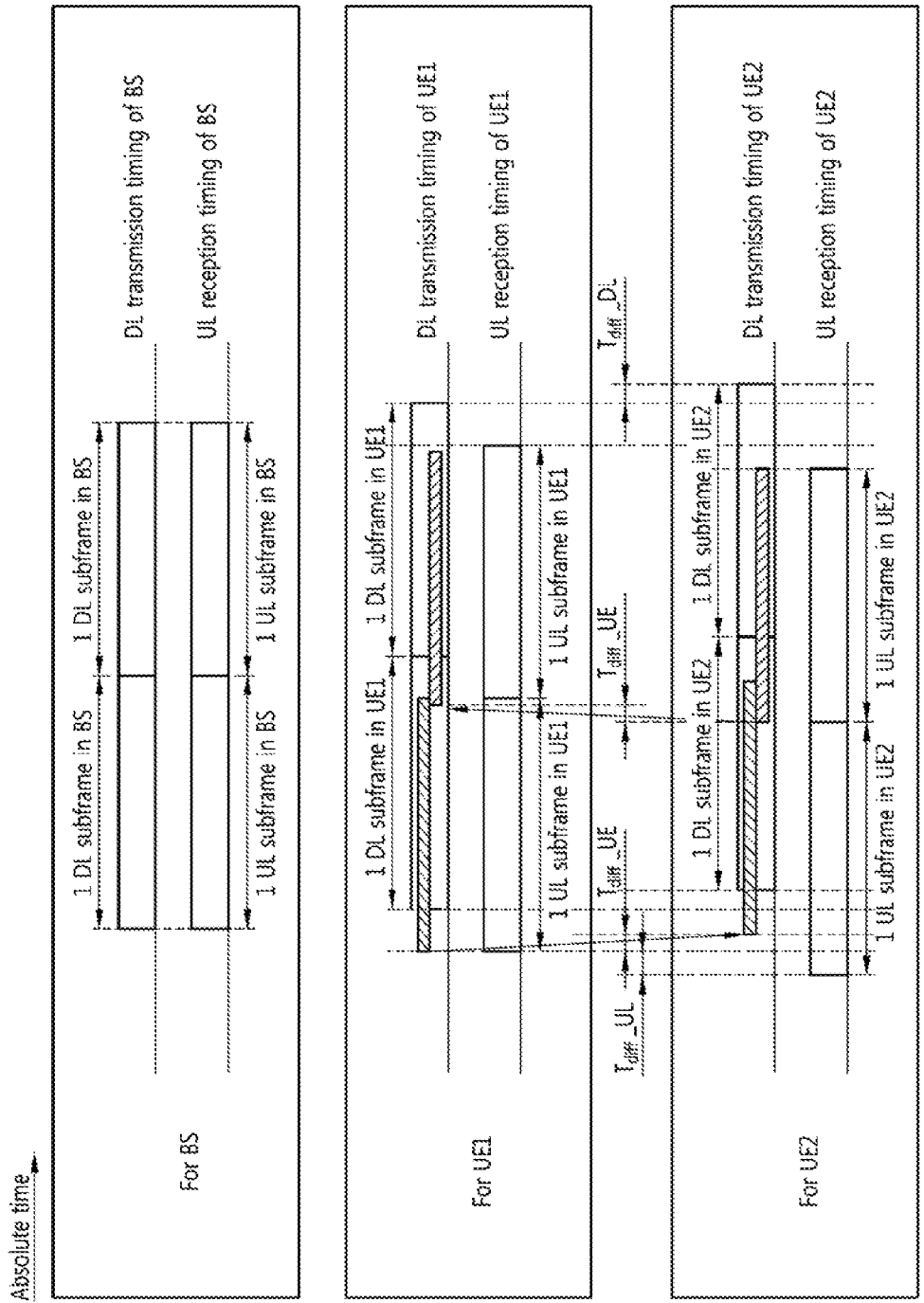
FIG. 14 illustrates a method for acquiring d-DL (direct-DL) timing and d-UL (direct-UL) timing according to the one example of the present invention.

FIG. 14 illustrates a method for acquiring d-DL (direct-DL) timing and d-UL (direct-UL) timing according to the one example of the present invention.

In FIG. 14, $T_{diff\text{-}DL}$ and $T_{diff\text{-}UL}$ represent the differences of DL reception timings and UL transmission timings between UE 1 and UE 2, respectively. Theoretically, since DL timing is associated with unidirectional propagation delay and UL timing is associated with bidirectional propagation delay, $T_{diff\text{-}UL}$ has two times the value compared to the value of $T_{diff\text{-}DL}$. Assuming two UEs are located in the same line connecting the BS, the unidirectional propagation delay $T_{diff\text{-}UE}$ according to the distance between two UEs can be represented as in Equation 3.

$$T_{diff\text{-}UE}=T_{diff\text{-}DL}=T_{diff\text{-}UL}/2 \qquad \text{<Equation 3>}$$

When two UEs are located with a distance of about 1 km, the propagation delay $T_{diff\text{-}UE}$ is 3.3356 us, and when two UEs are located nearly with a short distance (e.g. device-to-device (D2D) coverage), the propagation delay $T_{diff\text{-}UE}$ can be ignored.

Referring to FIG. 14, UE 1 and UE 2 perform d-UL transmission and d-DL reception using DL resource based on the UL transmission timing. The UL transmission timing can be configured by the BS or acquired from the BS.

UE 1 performs d-UL transmission 1 at the first DL subframe based on the UL timing 1, and UE 2 performs d-UL transmission 2 at the second DL subframe based on the UL timing 2. At this step, predetermined offset can be applied to the UL timing, or d-UL transmission can be performed at part of the subframe (e.g. slot) rather than at the entire subframe.

UE 2 performs d-DL reception 1 at the first DL subframe with time delay of $T_{diff\text{-}UE}$. UE 1 also performs d-DL reception 2 at the second DL subframe with time delay of $T_{diff\text{-}UE}$. The data received by d-DL reception 1 is the data transmitted by d-UL transmission 1, and the data received by d-DL reception 2 is the data transmitted by d-UL transmission 2. The d-DL reception timing 1 and 2 do not coincide with the DL reception timing 1 and 2, but lags behind the DL reception timing 1 and 2, respectively. Therefore, different timing than conventional DL timing is required for the d-DL reception.

Meanwhile, it is preferable that the DL subframe used for direct communication does not include the DL data received from the BS. For this purpose, when direct communication is performed, the BS can empty corresponding DL subframe to allocate the DL subframe as a dedicated resource for direct communication.

According to the method described above, UE can perform d-DL reception using the same frequency region as DL reception without additional hardware. At this step, the UE stores d-DL timing other than conventional DL timing in the buffer and can enhance the accuracy of the d-DL timing through the process of detecting and/or demodulation.

Figure 15:
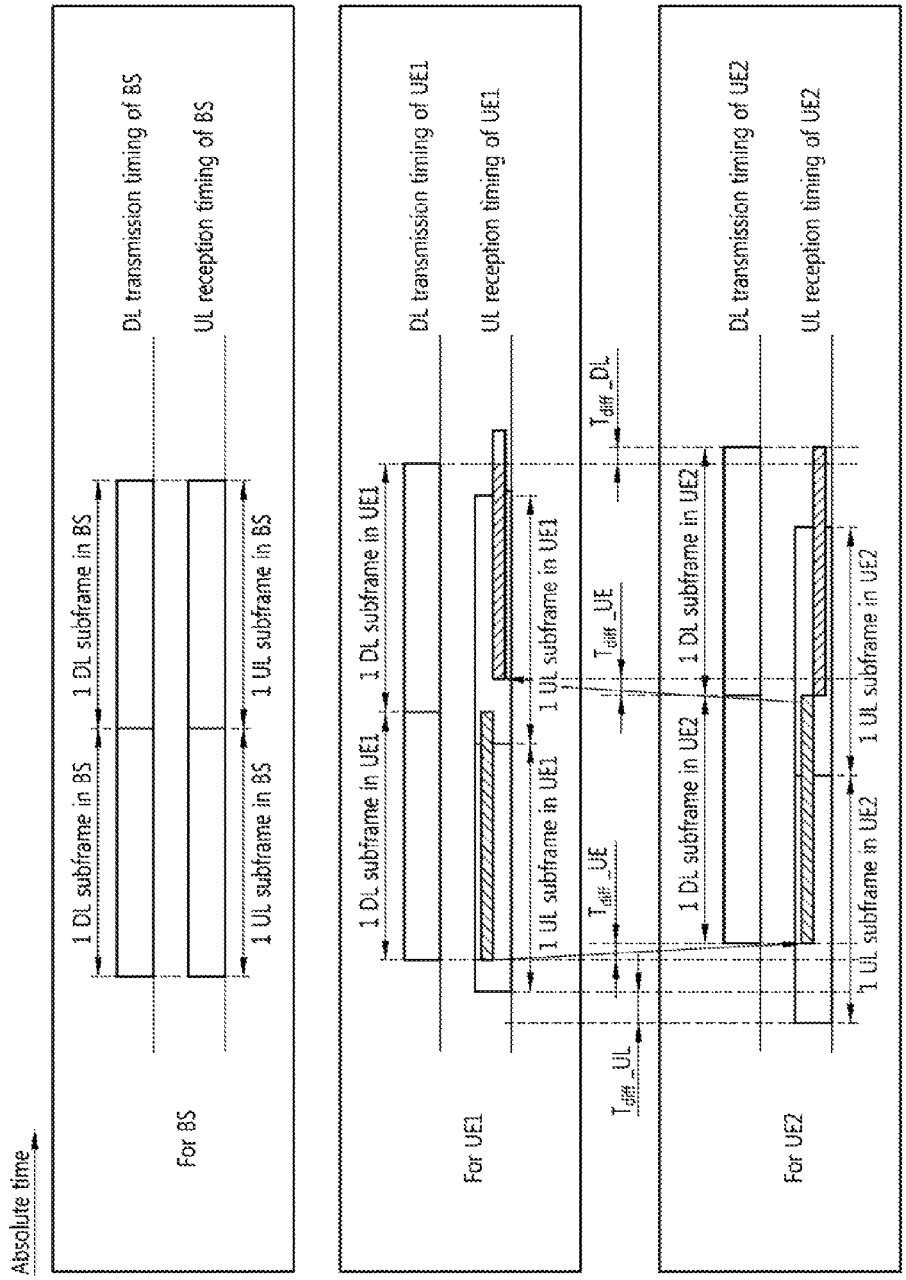
FIG. 15 illustrates a method for acquiring d-DL timing and d-UL timing according to another example of the present invention.

FIG. 15 illustrates a method for acquiring d-DL timing and d-UL timing according to another example of the present invention.

The meanings of $T_{diff\text{-}DL}$, $T_{diff\text{-}UL}$ and $T_{diff\text{-}UE}$ in FIG. 15 are the same as those in FIG. 14.

Referring to FIG. 15, UE 1 and UE 2 perform d-UL transmission and d-DL reception using UL resource based on the DL reception timing. The DL reception timing can be configured by the BS or acquired from the BS.

UE 1 performs d-UL transmission 1 at the first UL subframe based on the DL timing 1, and UE 2 performs d-UL transmission 2 at the second UL subframe based on the DL timing 2. At this step, predetermined offset can be applied to the DL timing, or d-UL transmission can be performed at part of the subframe (e.g. slot) rather than at the entire subframe.

UE 2 performs d-DL reception 1 at the first UL subframe with time delay of $T_{diff\text{-}UE}$. UE 1 also performs d-DL reception 2 at the second UL subframe with time delay of $T_{diff\text{-}UE}$. The data received by d-DL reception 1 is the data transmitted by d-UL transmission 1, and the data received by d-DL reception 2 is the data transmitted by d-UL transmission 2. The d-DL reception timing 1 coincides with the DL reception timing 1, but the d-DL reception time does not coincide with the DL reception timing 2. Therefore, different timing than conventional DL timing 2 is required for the d-DL reception 2.

Meanwhile, it is preferable that the UL subframe used for direct communication does not include the UL data transmitted to the BS. For this purpose, when direct communication is performed, the BS can empty corresponding UL subframe to allocate the UL subframe as a dedicated resource for direct communication.

According to the method described above, UE can perform d-UL transmission using the same frequency region as UL transmission without implementation of additional hardware for d-UL transmission.

Figure 16:
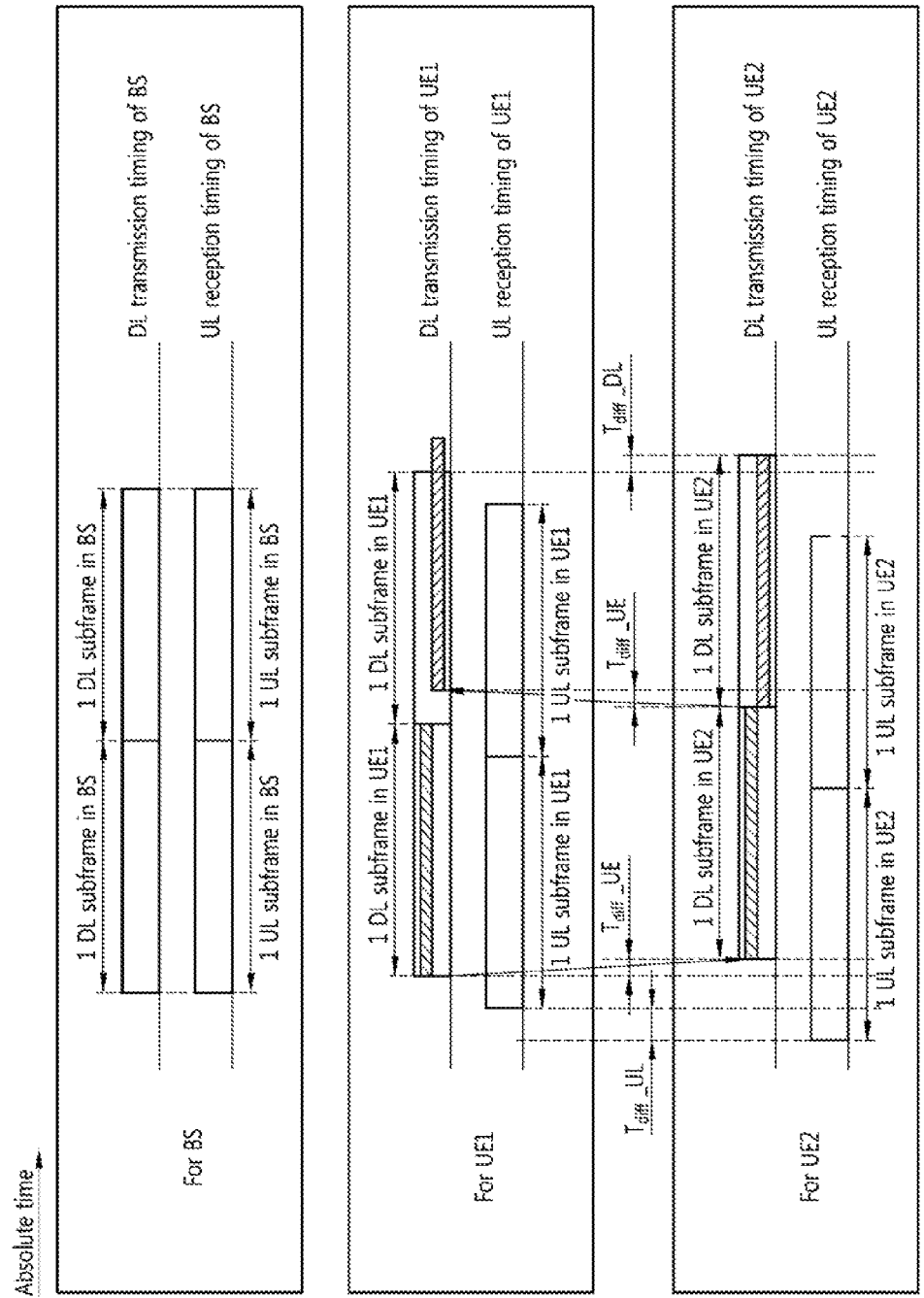
FIG. 16 illustrates a method for acquiring d-DL timing and d-UL timing according to another example of the present invention.

FIG. 16 illustrates a method for acquiring d-DL timing and d-UL timing according to another example of the present invention.

The meanings of $T_{diff\text{-}DE}$, $T_{diff\text{-}UL}$ and $T_{diff\text{-}UE}$ in FIG. 16 are the same as those in FIG. 14.

Referring to FIG. 16, UE 1 and UE 2 perform d-UL transmission and d-DL reception using DL resource based on the DL reception timing. The DL reception timing can be configured by the BS or acquired from the BS.

UE 1 performs d-UL transmission 1 at the first DL subframe based on the DL timing 1, and UE 2 performs d-UL transmission 2 at the second DL subframe based on the DL timing 2. At this step, predetermined offset can be applied to the DL timing, and d-UL transmission can be performed at part of the subframe (e.g. slot) rather than at the entire subframe.

UE 2 performs d-DL reception 1 at the first DL subframe with time delay of $T_{\mathit{diff-UE}}$. UE 1 also performs d-DL reception 2 at the second DL subframe with time delay of $T_{\mathit{diff-UE}}$. The data received by d-DL reception 1 is the data transmitted by d-UL transmission 1, and the data received by d-DL reception 2 is the data transmitted by d-UL transmission 2. The d-DL reception timing 1 coincides with the DL reception timing 1, but the d-DL reception time does not coincide with the DL reception timing 2. Therefore, different timing than conventional DL timing 2 is required for the d-DL reception 2.

Meanwhile, it is preferable that the DL subframe used for direct communication does not include the DL data received from the BS. For this purpose, when direct communication is performed, the BS can empty corresponding DL subframe to allocate the DL subframe as a dedicated resource for direct communication.

According to the method described above, UE can perform d-DL reception using the same frequency region as DL reception without implementing additional hardware. At this step, UE can store different d-DL timing than conventional DL timing in the buffer, and enhance the accuracy of the d-DL timing through the process of detecting and/or demodulating.

Figure 17:
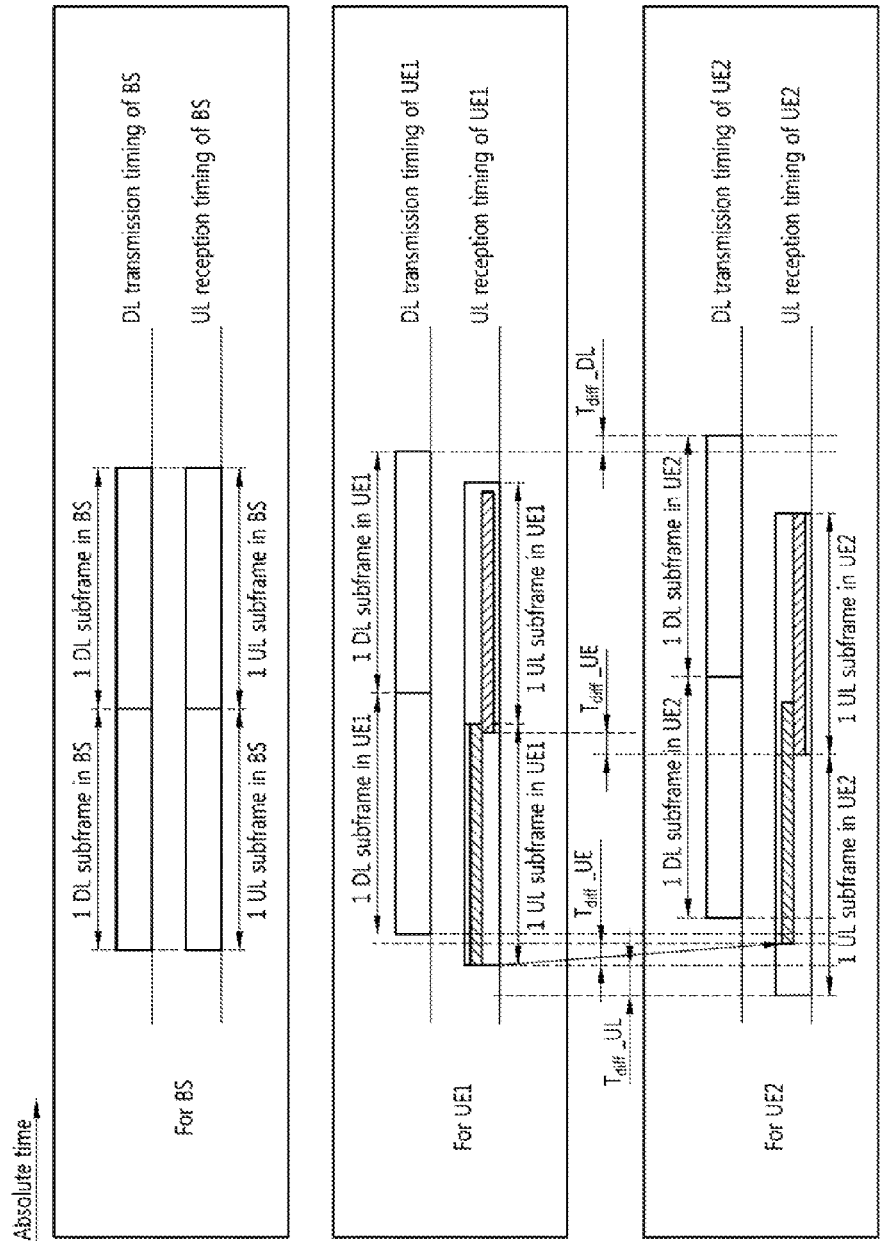
FIG. 17 illustrates a method for acquiring d-DL timing and d-UL timing according to another example of the present invention.

FIG. 17 illustrates a method for acquiring d-DL timing and d-UL timing according to another example of the present invention.

In FIG. 17, the meanings of $T_{\mathit{diff-DL}}$, $T_{\mathit{diff-UL}}$ and $T_{\mathit{diff-UE}}$ are the same as those in FIG. 14.

Referring to FIG. 17, UE 1 and UE 2 perform d-UL transmission and d-DL reception using UL resource based on the UL transmission timing. The UL reception timing can be configured by the BS or acquired from BS.

UE 1 performs d-UL transmission 1 at the first UL subframe based on the UL timing 1, and UE 2 performs d-UL transmission 2 at the second UL subframe based on the UL timing 2. At this step, predetermined offset can be applied to the UL timing, or d-UL transmission can be performed at part of the subframe (e.g. slot) rather than at the entire subframe.

UE 2 performs d-DL reception 1 at the first UL subframe with time delay $T_{\mathit{diff-UE}}$. UE 1 also performs d-DL reception 2 at the second UL subframe with time delay of $T_{\mathit{diff-UE}}$. The data received by d-DL reception 1 is the data transmitted by d-UL transmission 1, and the data received by d-DL reception 2 is the data transmitted by d-UL transmission 2. The d-DL reception timing 1 and 2 do not coincide with the DL reception timing 1 and 2. Therefore, different timing than conventional DL timing is required for the d-DL reception.

Meanwhile, it is preferable that the UL subframe used for direct communication does not include UL data transmitted to the BS. For this purpose, when direct communication is performed, the BS can empty corresponding UL subframe to allocate the UL subframe as a dedicated resource for direct communication.

According to the method described above, UE can perform d-UL transmission at the same frequency region as UL transmission without implementing additional hardware. Powers of the UL transmission and the d-UL transmission can be determined differently depending on the situation.

Meanwhile, communication between UEs in direct communication system can be affected by the interference caused by the communication between other UEs and the BS. This interference can be represented as inter-symbol interference, inter-slot interference or inter-subframe interference in time domain, and as inter-subcarrier interference in frequency domain. In the description below, inter-symbol interference refers to inter-slot interference and inter-subframe interference comprehensively.

Inter-symbol interference means the interference due to misalignment of the signals received from multiple UEs in time domain, which is generated by the symbols received by other UEs in the fast Fourier transform (FFT) window for the OFDMA symbol (or SC-FDMA symbol, DFT-S OFDMA symbol) received from specific UEs.

Inter-subcarrier interference means that received signals are not aligned in time domain, and that phase discontinuity is generated in FFT window for OFDMA symbol (or SC-FDMA symbol, DFT-S OFDMA symbol) and subcarrier orthogonality is hindered.

In the description below, the symbol can mean OFDMA symbol, SC-FDMA symbol and DFT-S OFDMA symbol altogether. In other words, the present invention is not limited by the access scheme and can be applied to communication systems of various access schemes.

FIGS. 18-21 illustrate the interferences that can occur in the examples of FIGS. 14-17.

Figure 18:
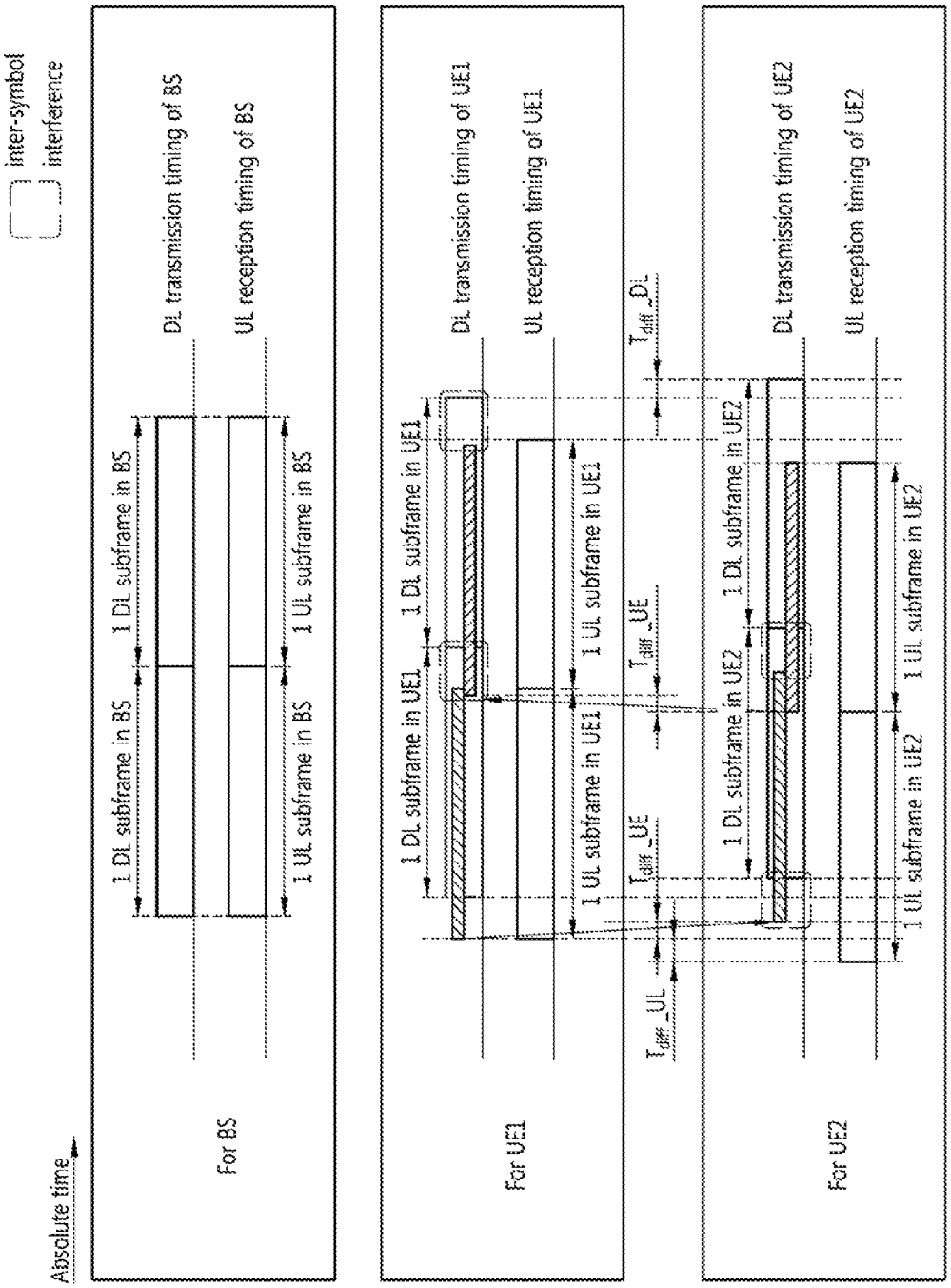
FIGS. 18-21 illustrate interferences that can occur in the examples of FIGS. 14-17.

FIG. 18 illustrates the interference that can occur in the example of FIG. 14.

The d-UL transmission at the first DL subframe by UE 1 does not coincide with the first DL subframe between UE 2 and the BS in timing. Also, the d-UL transmission at the second DL subframe by UE 2 does not coincide with the second DL subframe between UE 1 and the BS in timing. This misalignment can cause inter-symbol interference and inter-subcarrier interference.

Figure 19:
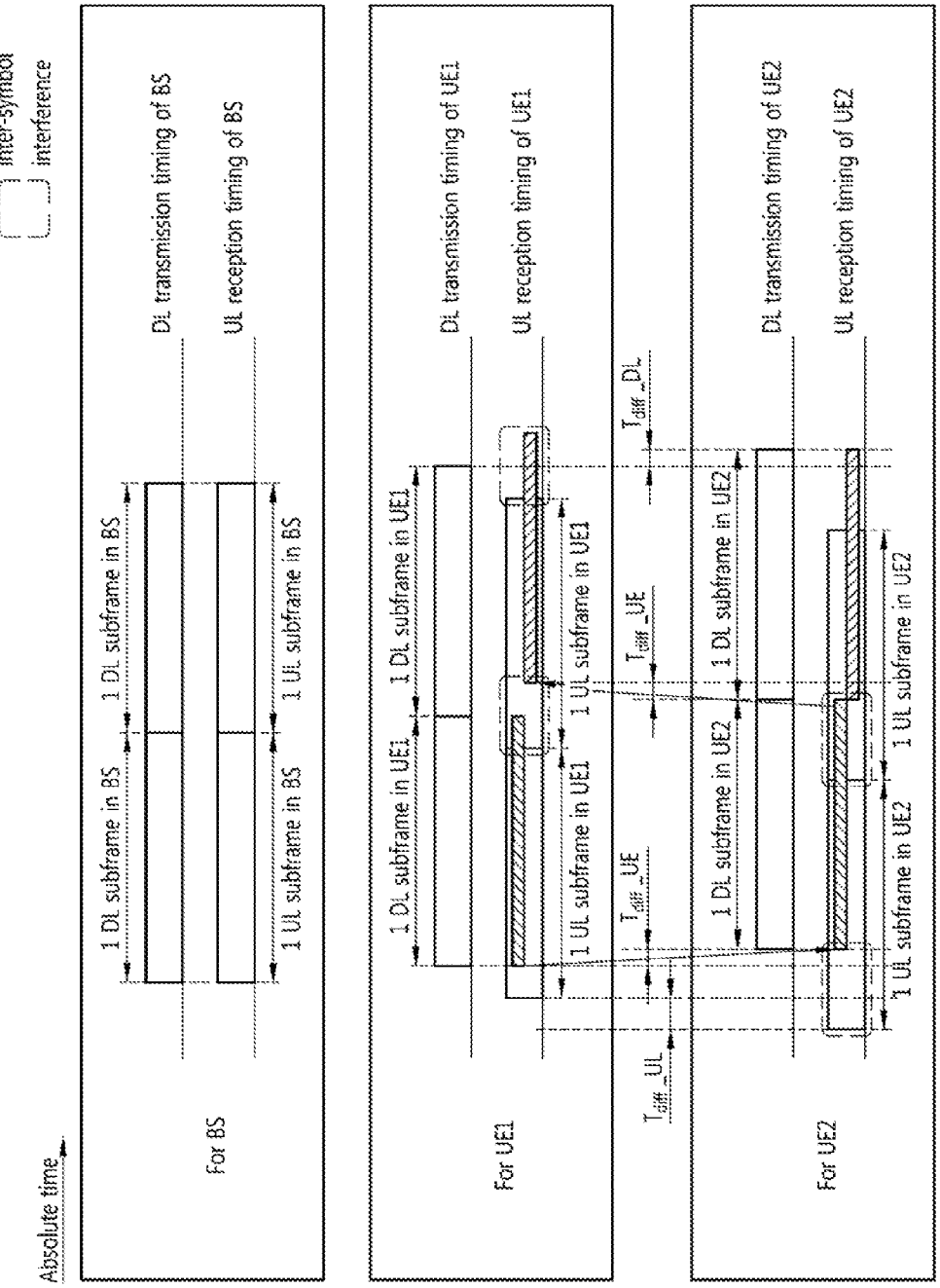

FIG. 19 illustrates the interference that can occur in the example of FIG. 15.

The d-UL transmission at the first UL subframe by UE 1 does not coincide with the first UL subframe between UE 2 and the BS in timing. Also, the d-UL transmission at the second UL subframe by UE 2 does not coincide with the second UL subframe between UE 1 and the BS in timing. This misalignment can cause inter-symbol interference and inter-subcarrier interference.

Figure 20:
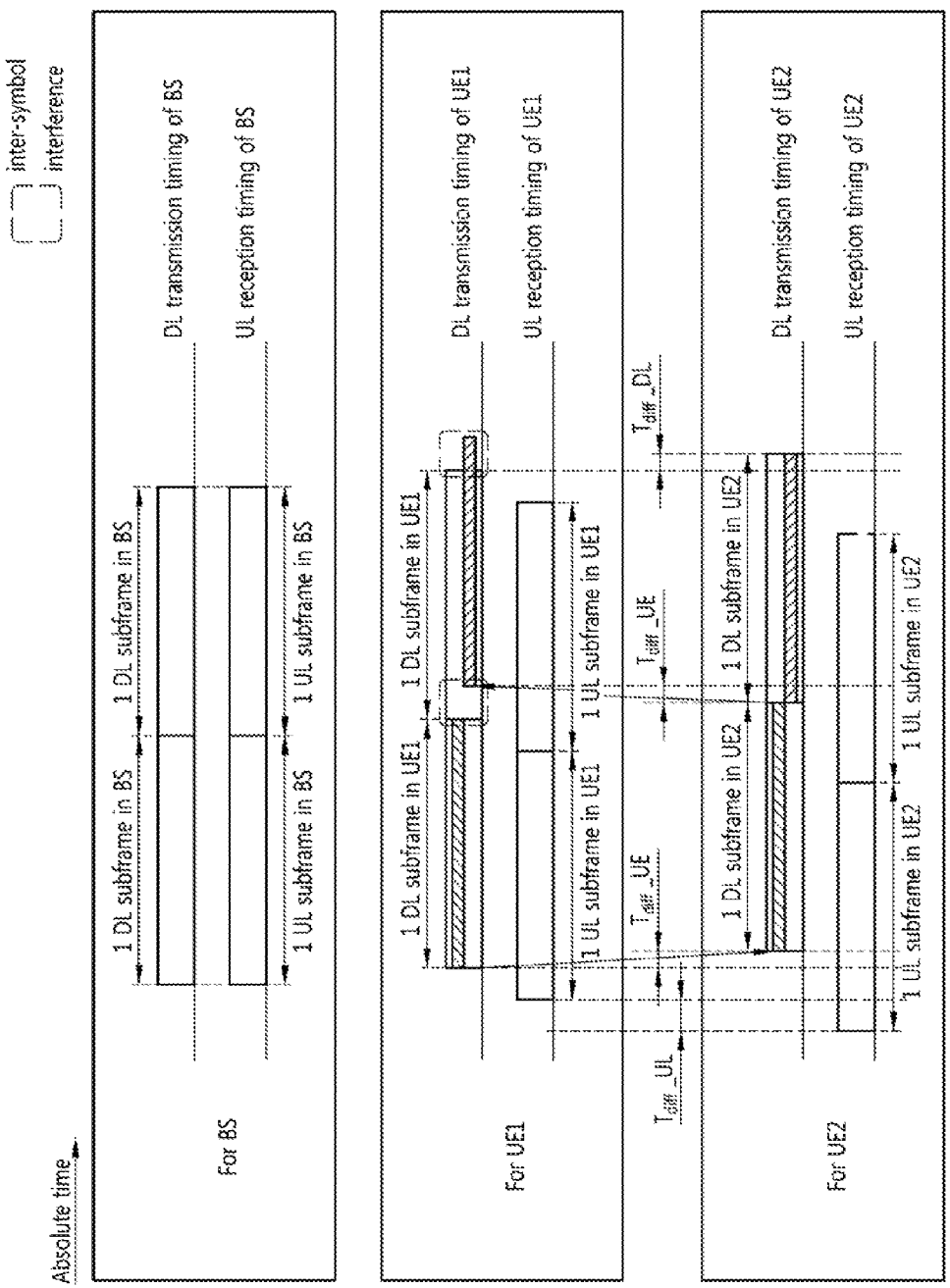

FIG. 20 illustrates the interference that can occur in the example of FIG. 16.

The d-UL transmission at the first DL subframe by UE 1 does not coincide with the first DL subframe between UE 2 and the BS in timing. Also, the d-UL transmission at the second DL subframe by UE 2 does not coincide with the second DL subframe between UE 1 and the BS in timing. This misalignment can cause inter-symbol interference and inter-subcarrier interference.

Figure 21:
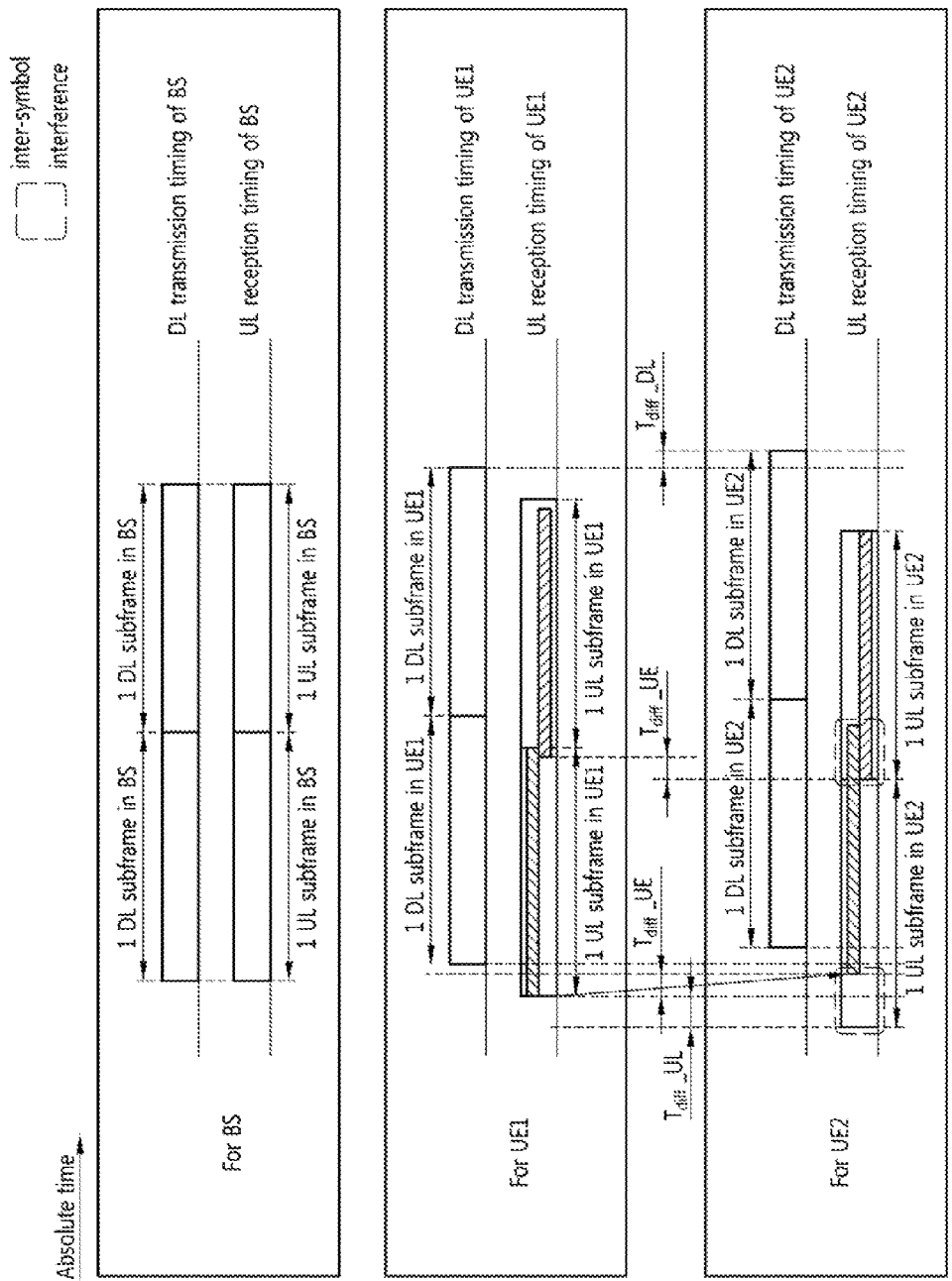

FIG. 21 illustrates the interference that can occur in the example of FIG. 17.

The d-UL transmission at the first UL subframe by UE 1 does not coincide with the first UL subframe between UE 2 and the BS in timing. Also, the d-UL transmission at the second UL subframe by UE 2 does not coincide with the second UL subframe between UE 1 and the BS in timing. This misalignment can cause inter-symbol interference and inter-subcarrier interference.

One of the following methods can be applied in order to prevent these inter-symbol interference and/or inter-subcarrier interference.

<Method 1> Using N Guard Symbols

In one example of the present invention, predetermined N symbols causing inter-symbol interference can be used as guard symbols. Guard symbols mean the symbols which have no actually transmitted signal. In other words, UE can use N guard symbols for direct communication, and perform d-UL transmission on other symbols through encoding process such as channel coding.

Since inter-symbol interference is mainly caused by propagation delay according to the distance between UEs, the degree of interference can vary depending on the distance between UEs. When the distance between UEs is 1 km, for example, propagation delay $T_{diff-UE}$ is 3.3356 us which is much smaller than 1-OFDMA symbol duration, and it is sufficient to use only one OFDMA symbol as a guard symbol.

Figure 22:
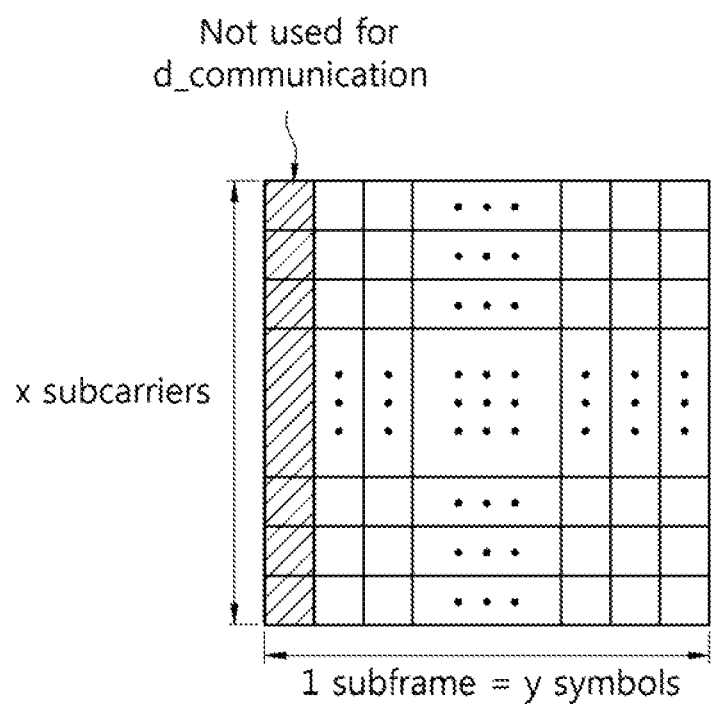
FIGS. 22-24 illustrate a method for using a guard symbol according to one example of the present invention.
Figure 23:
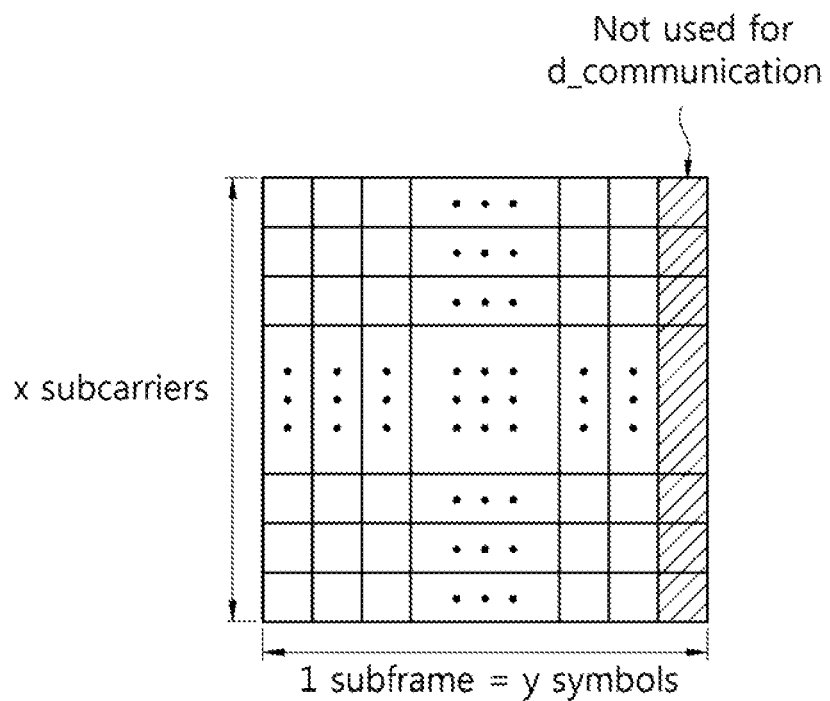
Figure 24:
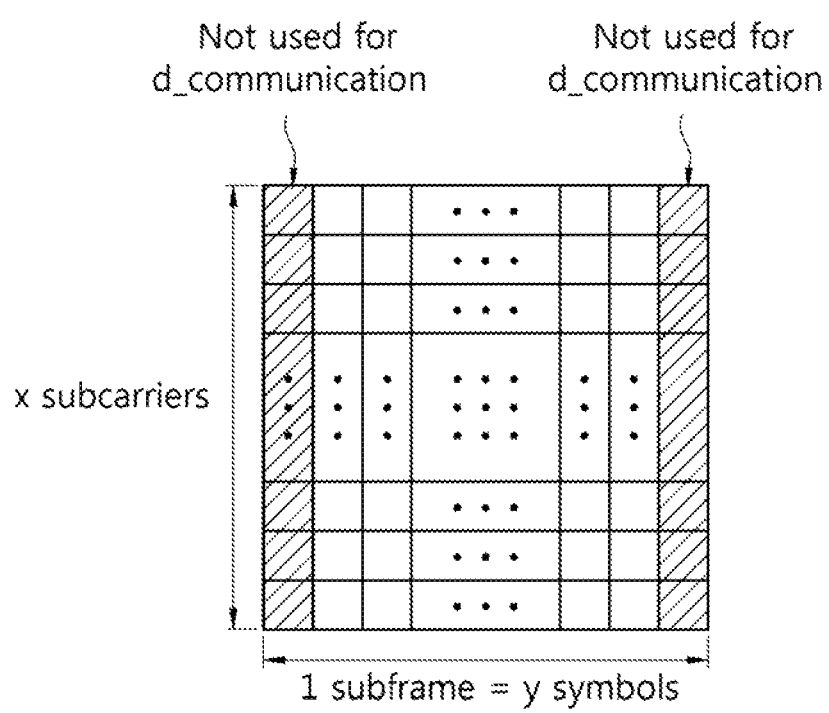

FIGS. 22-24 illustrate a method for using a guard symbol according to one example of the present invention.

UE can, as in FIG. 22, use the first OFDMA symbol as a guard symbol to prevent inter-symbol interference when performing d-UL transmission. Alternatively, UE can, as in FIG. 23, use the last OFDMA symbol as a guard symbol, or, as in FIG. 24, use the first OFDMA symbol and the last OFDMA symbol as guard symbols. At this step, the first and last OFDMA symbols mean both ends of the subcarrier of the radio resource allocated for d-UL transmission of a specific UE (or UE-group).

<Method 2> Puncturing N Symbols

In one example of the present invention, predetermined N symbols causing inter-symbol interference can be punctured.

As described above in detail, inter-symbol interference is mainly caused by propagation delay according to the distance between UEs, and the degree of interference can vary depending on the distance between UEs. When the distance between UEs is 1 km, for example, propagation delay, $T_{diff-UE}$, is 3.3356 us which is much smaller than 1-OFDMA symbol duration, and it is sufficient to puncture only one OFDMA symbol.

UE can puncture the symbol corresponding to the guard symbol in FIGS. 22-24 to prevent inter-symbol interference when performing d-UL transmission. For example, UE can puncture the first OFDMA symbol as in FIG. 22. Alternatively, UE can, as in FIG. 23, puncture the last OFDMA symbol, or, as in FIG. 24, the first and last OFDMA symbols.

<Method 2-1> Using a Sounding Subframe

Figure 25:
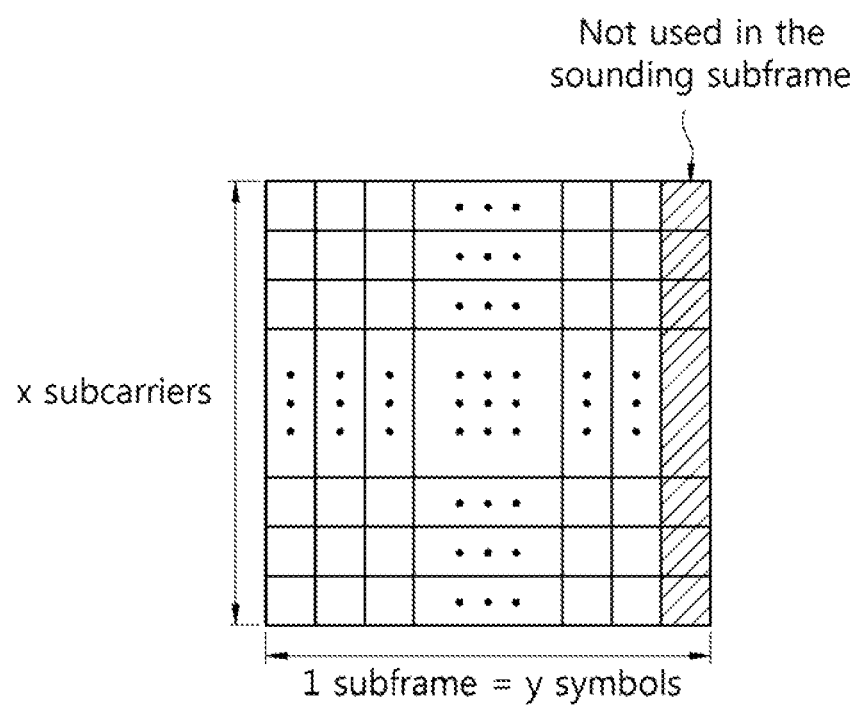
FIG. 25 illustrates one example of implicitly puncturing the last symbol of a sounding subframe.

In 3GPP LTE, UE punctures the last OFDMA symbol of the sounding subframe in order to prevent the interference with sounding transmission by other UE when performing UL transmission at the subframe designated as the cell-specific sounding subframe or UE-specific sounding subframe. FIG. 25 illustrates one example of implicitly puncturing the last symbol of a sounding subframe.

Figure 26:
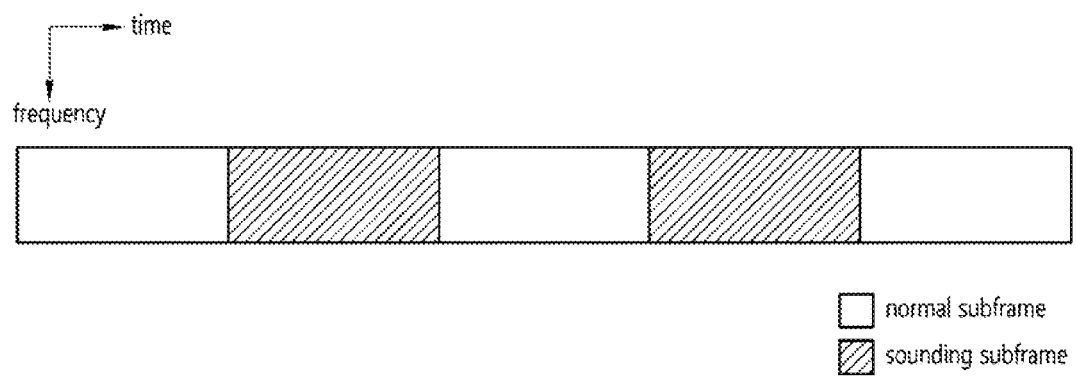
FIG. 26 illustrates one example of a sounding subframe for direct communication.

Therefore, when d-UL transmission for direct communication is carried out on UL carrier, direct communication can be specified to be performed in the sounding subframe. According to this method, UEs performing direct communication may not define punctured symbol separately nor perform the signaling. FIG. 26 illustrates one example of a sounding subframe for direct communication.

<Method 3> Using a Subframe with an Extended CP

Is 3GPP LTE, two types of CPs exist, a normal CP ($\Delta f=15$ kHz) and an extended CP ($\Delta f=7.5$ kHz). A normal CP is generally used and has the length of 5.21 us or 4.69, and an extended CP is used for broadcasting such as MBSFN and has the length of 16.67 us.

Figure 27:
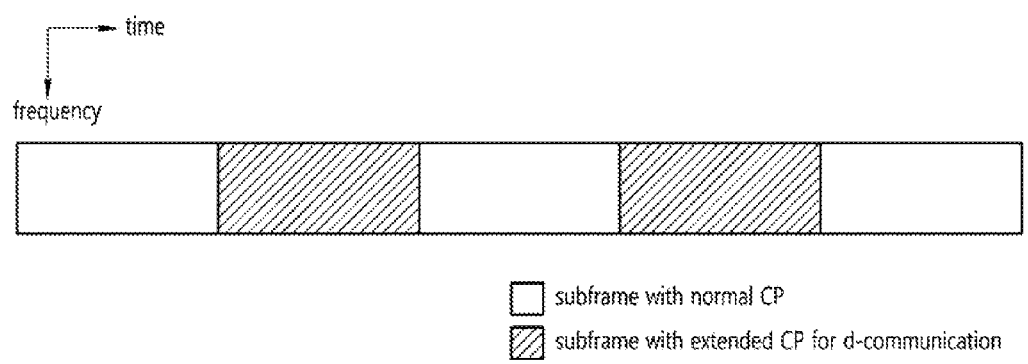
FIG. 27 illustrates one example of using a subframe with an extended CP for direct communication.

In one example of the present invention, the subframe with the normal CP can be configured for the communication with the BS, but the subframe with the extended CP can be configured for direct communication between UEs, in order to prevent inter-symbol interference. FIG. 27 illustrates one example of using a subframe with an extended CP for direct communication.

<Method 3-1> The Case where d-UL Transmission is Performed on DL Carrier

In 3GPP LTE, MBSFN subframe is configured through MBSFN-subframeConfigList at SystemInformationBlockType2 by radio resource control (RRC) layer. The MBSFN subframe may refer to the Section 5.8 and 6.3.7 of the 3GPP TS 36.311 V10.4.0 (2012-December).

Figure 28:
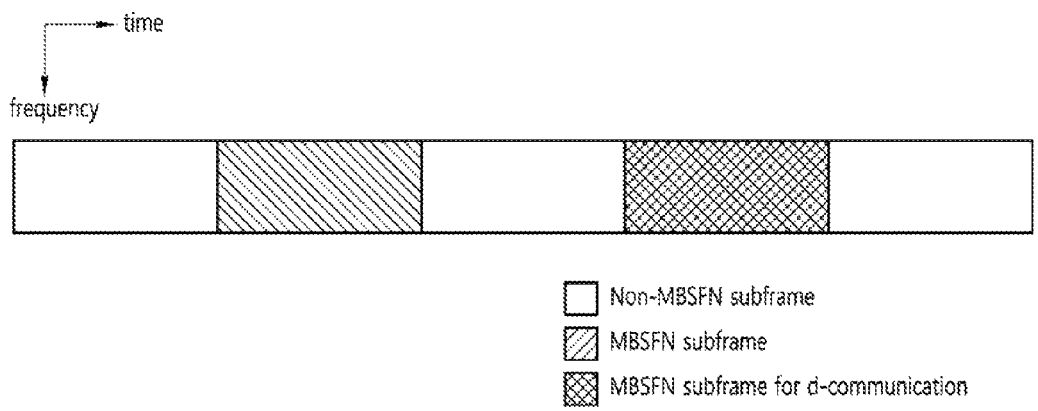
FIG. 28 illustrates one example of a configuration of a subset of MBSFN subframes as a subframe for direct communication.

In the case where d-UL transmission is performed on the DL carrier, a subset of MBSFN subframes can be configured as the subframe for direct communication. FIG. 28 illustrates one example of a configuration of a subset of MBSFN subframes as a subframe for direct communication. At this step, the MBSFB subframe configured as the subframe for direct communication should use extended CP, although non-MBSFN subframe can use normal CP or extended CP.

<Method 4> Applying Time Offset

The methods 1-3 described above are especially effective in removing the interference of following subframes. In one example of the present invention, time offset can be applied to the subframe for direct communication in order to remove interferences of preceding subframes more effectively. FIG. 29 illustrates one example of applying time offset to a subframe for direct communication.

Referring to FIG. 29, transmission can be delayed by predetermined or signaled time offset $T_{offset}$ so that the subframe for direct communication and the subframe for communication with the BS are not overlapped. For example, time offset can be determined as the unidirectional propagation delay, bidirectional propagation delay or half of one symbol duration, and d-UL transmission can be performed with the delay of the corresponding time offset.

Figure 30:
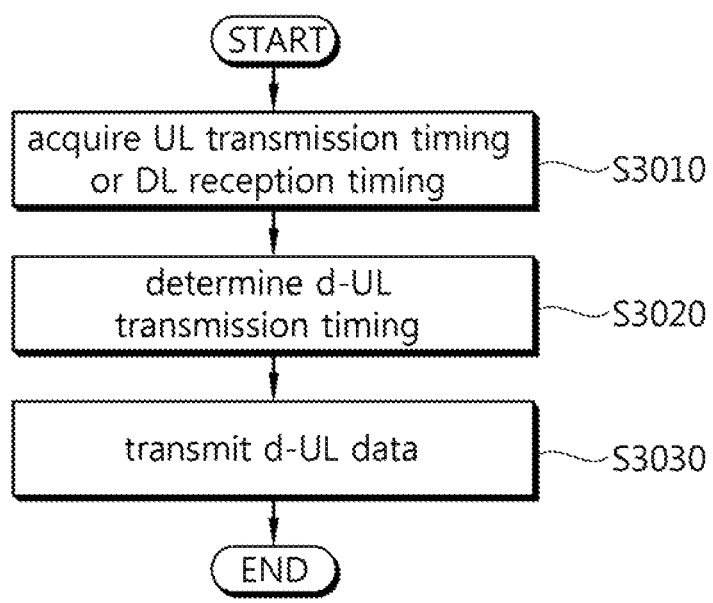
FIG. 30 illustrates a method for data transmission according to one example of the present invention.

FIG. 30 illustrates a method for data transmission according to one example of the present invention.

A first wireless device acquires uplink transmission timing or downlink reception timing from the BS (S3010). The downlink reception timing can be acquired by using the DL synchronization signal, and the uplink transmission timing can be acquired based on the downlink reception timing.

The first wireless device, then, determines uplink transmission timing for direct communication with a second wireless device based on the uplink transmission timing or downlink reception timing (S3020). The uplink transmission timing for direct communication can coincide with the uplink transmission timing or downlink reception timing, or the value of time offset can be applied.

The first wireless device transmits direct communication uplink data to the second wireless device at the uplink transmission timing for the direct communication (S3030). At this step, to perform transmission of the direct communication uplink data, the first wireless device can use the subframe on the uplink resource for transmission to the BS, or the subframe on the downlink resource for reception from BS. The subframe can include at least one guard symbol, or at least one punctured symbol. Also, the subframe can be a sounding subframe or an MBSFN subframe using extended cyclic prefix (CP).

Figure 31:
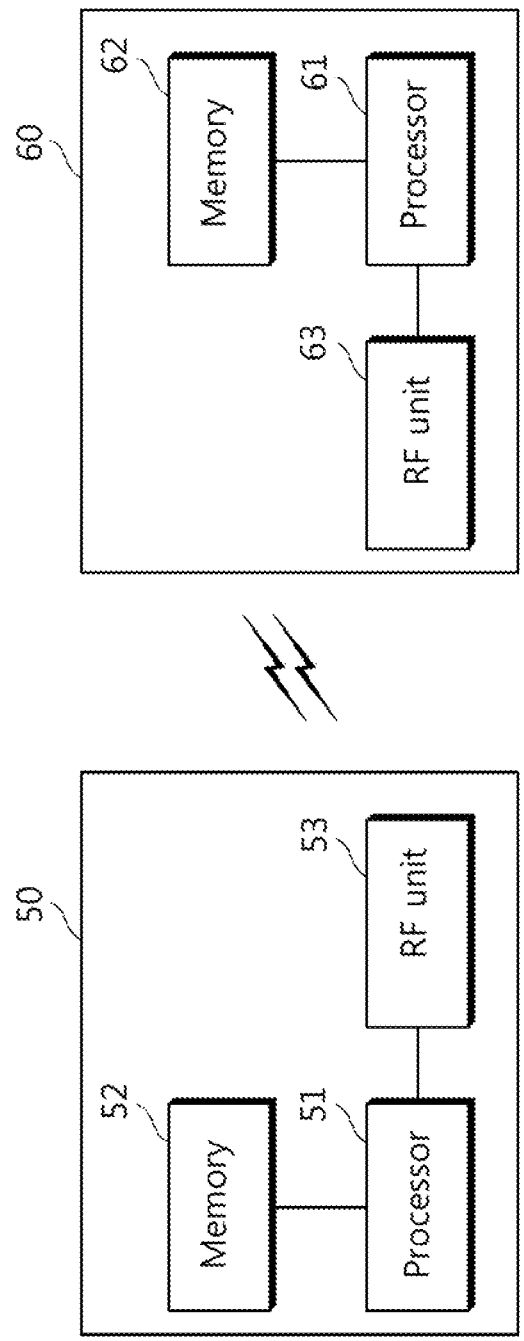
FIG. 31 illustrates a wireless communication system in which an embodiment of the present invention is implemented.

FIG. 31 illustrates a wireless communication system in which an embodiment of the present invention is implemented.

A base station 50 comprises a processor 51, a memory 52, and an RF (Radio Frequency) unit 53. The memory 52, being connected to the processor 51, stores various pieces of information needed for operating the processor 51. The RF unit 53, being connected to the processor 51, transmits and/or receives radio signals. The processor 51 implements proposed functions, procedures, and/or methods. Operation of the base station in the embodiment described above can be realized by the processor 51.

A UE 60 comprises a processor 61, a memory 62, and an RF unit 63. The memory 62, being connected to the processor 61, stores various pieces of information needed for operating the processor 61. The RF unit 63, being connected to the processor 61, transmits and/or receives radio signals. The processor 61 implements proposed functions, procedures, and/or methods. Operation of the UE in the embodiment described above can be realized by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above description of direct communication, the subframe for direct communication does not exclude the conventional communication between a BS and a UE. In other words, the subframe for direct communication can be used either for direct communication only, or for the conventional communication between a BS and a UE. Also, partial region (or resource block) of specific subframe can be used for direct communication and other region for the conventional communication between a BS and a UE.

Meanwhile, the above described methods can be applied to the entire procedures of the direct communication, or only to the step of initial access/search. The step of initial access/search can include UL synchronization procedure such as random access procedure of 3GPP LTE, or establishing a link by searching neighbor UEs. The methods described above can be applied to all UEs or only to the UEs instructed by the base station.

Also, the above described methods can be modified to be applied to acquisition of synchronization between multiple BSs and one UE. For example, the UE can acquire synchronization with other non-serving BSs based on the synchronization with the serving BS. Also, the methods can be modified to be applied to acquire synchronization of other UEs based on the synchronization between one UE and a BS.

What is claimed is:

1. A method for communicating between wireless devices in a wireless communication system, the method comprising:
   determining, by a first wireless device, a downlink reception timing for receiving a downlink subframe with a base station;
   determining, by the first wireless device, an uplink transmission timing for transmitting an uplink subframe with the base station, the uplink subframe including a plurality of Single Carrier-Frequency Division Multiple Access (SC-FDMA) symbols; and
   communicating, by the first wireless device, directly with a second wireless device by using the uplink subframe,
   wherein a last SC-FDMA symbol of the uplink subframe is not used for direct communication between the first wireless device and the second wireless device.

2. The method of claim 1, wherein the direct communication between the first wireless device and the second wireless device is performed based on the downlink reception timing.

3. The method of claim 2, wherein the direct communication between the first wireless device and the second wireless device is performed not based on the uplink transmission timing.

4. The method of claim 1, wherein the uplink subframe for the direct communication uses an extended cyclic prefix.

5. A device for communicating with a wireless device in a wireless communication system, the device comprising:
   a radio frequency (RF) unit configured to transmit and receive radio signals; and
   a processor operatively connected to the RF unit and configured to:
   determine a downlink reception timing for receiving a downlink subframe with a base station;
   determine an uplink transmission timing for transmitting an uplink subframe with the base station, the uplink subframe including a plurality of Single Carrier-Frequency Division Multiple Access (SC-FDMA) symbols; and
   instruct the RF unit to communicate directly with a wireless device by using the uplink subframe,
   wherein a last SC-FDMA symbol of the uplink subframe is not used for direct communication with the wireless device.

6. The device of claim 5, wherein the direct communication with the wireless device is performed based on the downlink reception timing.

7. The device of claim 6, wherein the direct communication with the wireless device is performed not based on the uplink transmission timing.

8. The device of claim 5, wherein the uplink subframe for the direct communication uses an extended cyclic prefix.

* * * * *